United States Patent
Akashi et al.

(10) Patent No.: US 12,492,897 B2
(45) Date of Patent: Dec. 9, 2025

(54) INERTIAL FORCE SENSOR

(71) Applicant: KABUSHIKI KAISHA TOYOTA CHUO KENKYUSHO, Nagakute (JP)

(72) Inventors: Teruhisa Akashi, Nagakute (JP); Shota Harada, Nisshin (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 343 days.

(21) Appl. No.: 18/170,732

(22) Filed: Feb. 17, 2023

(65) Prior Publication Data
US 2023/0324174 A1 Oct. 12, 2023

(30) Foreign Application Priority Data
Mar. 24, 2022 (JP) .................................. 2022-048963

(51) Int. Cl.
| | |
|---|---|
| *G01C 19/06* | (2006.01) |
| *G01C 19/32* | (2006.01) |
| *G01C 19/5776* | (2012.01) |
| *G01C 19/5783* | (2012.01) |

(52) U.S. Cl.
CPC ........... *G01C 19/065* (2013.01); *G01C 19/32* (2013.01); *G01C 19/5776* (2013.01); *G01C 19/5783* (2013.01)

(58) Field of Classification Search
None
See application file for complete search history.

(56) References Cited

U.S. PATENT DOCUMENTS

| | | | | |
|---|---|---|---|---|
| 8,056,412 | B2 * | 11/2011 | Rutkiewicz | G01C 21/166 73/510 |
| 9,279,682 | B2 * | 3/2016 | Renault | G01P 1/02 |
| 2003/0163282 | A1 * | 8/2003 | Krieg | G01C 21/183 702/152 |
| 2003/0209789 | A1 * | 11/2003 | Hanson | G01C 21/166 257/678 |
| 2009/0013783 | A1 * | 1/2009 | Andersson | G01P 15/18 73/504.03 |
| 2009/0255335 | A1 * | 10/2009 | Fly | G01C 19/5719 73/493 |
| 2009/0308157 | A1 * | 12/2009 | Eriksen | G01C 21/166 228/208 |

(Continued)

FOREIGN PATENT DOCUMENTS

JP 2013-044645 A 3/2013

*Primary Examiner* — Mark A Shabman
(74) *Attorney, Agent, or Firm* — Oliff PLC

(57) ABSTRACT

An inertial force sensor may comprise: a base; a first block including an inclined surface that is inclined with respect to a base surface; a second block including an inclined surface that is inclined with respect to the base surface; a third block including an inclined surface that is inclined with respect to the base surface; a fourth block including an inclined surface that is inclined with respect to the base surface; and a connector configured to physically connect the first, second, third, and fourth blocks. In this inertial force sensor, the first and second blocks are aligned along a first direction parallel to the base surface with their inclined surfaces both facing inward or outward, and the third and fourth blocks are aligned along a second direction parallel to the base surface and orthogonal to the first direction with their inclined surfaces both facing inward or outward.

20 Claims, 39 Drawing Sheets

(56) References Cited

U.S. PATENT DOCUMENTS

2014/0013843 A1* 1/2014 Buck ................... G01P 1/023
  73/493
2022/0178692 A1* 6/2022 Bobba ................ G01C 21/166
2022/0364864 A1* 11/2022 Ueda .................. G01D 11/30

* cited by examiner

FIG. 30

|  | S2-S3 Plane | S1-S2 Plane | S2-S4 Plane | S2-S5 Plane | S1-S3 Plane |
|---|---|---|---|---|---|
|  | Ideal Angle: 90 Degree | Ideal Angle: 45 Degree | Ideal Angle: 90 Degree | Ideal Angle: 90 Degree | Ideal Angle: 45 Degree |
| Sample 1 | 89.936 | 45.003 | 90.043 | 90.010 | 45.061 |
| Sample 2 | 89.976 | 45.048 | 90.037 | 89.998 | 44.976 |
| Sample 3 | 89.993 | 45.090 | 90.046 | 89.989 | 44.917 |
| Sample 4 | 89.969 | 45.049 | 89.989 | 90.007 | 44.982 |
| Average | 89.968 | 45.047 | 90.029 | 90.001 | 44.984 |
| Degree of Error | -0.032 | 0.047 | 0.029 | 0.001 | -0.016 |

INERTIAL FORCE SENSOR

REFERENCE TO RELATED APPLICATIONS

This application claims priority to Japanese patent application No. 2022-048963, filed on Mar. 24, 2022, the entire contents of which are incorporated herein by reference.

BACKGROUND ART

The art disclosed herein relates to inertial force sensors.

JP 2013-44645 A describes a physical quantity sensor module provided with three physical quantity sensors. Specifically, in JP 2013-44645 A, the physical quantity sensors are each arranged on a surface of corresponding one of three triangular blocks, and these three blocks are mounted on a circuit board such that the physical quantity sensors are oriented toward different directions from one another.

DESCRIPTION

The sensor module described in JP 2013-44645 A fixes the three blocks on the circuit board, thus it is difficult to implement relative positions between those sensors precisely as designed. If the relative positions of the sensors are displaced from their designed values, detection accuracy decreases. Due to this, in the sensor module configured to detect physical quantities using multiple sensors, the relative positions of the sensors need to be controlled with high precision to enable high-accuracy detection. The description herein aims to provide an inertial force sensor with improved detection accuracy.

An aspect of an inertial force sensor disclosed herein may comprise a base; a first block mounted on the base and including an inclined surface that is inclined with respect to a surface of the base; a second block mounted on the base and including an inclined surface that is inclined with respect to the surface of the base; a third block mounted on the base and including an inclined surface that is inclined with respect to the surface of the base; a fourth block mounted on the base and including an inclined surface that is inclined with respect to the surface of the base; a first single-axis inertial force sensor arranged on the inclined surface of the first block; a second single-axis inertial force sensor arranged on the inclined surface of the second block; a third single-axis inertial force sensor arranged on the inclined surface of the third block; a fourth single-axis inertial force sensor arranged on the inclined surface of the fourth block; a connector configured to physically connect the first, second, third, and fourth blocks; and a circuit arithmetic processing and output module configured to execute an arithmetic algorithm that processes an output from each of the single-axis inertial force sensors and an output algorithm that outputs multiple-axis inertial force obtained by the arithmetic algorithm, wherein the first and second blocks are aligned along a first direction parallel to the surface of the base with their inclined surfaces both facing inward or both facing outward, and the third and fourth blocks are aligned along a second direction parallel to the surface of the base and orthogonal to the first direction with their inclined surfaces both facing inward or both facing outward.

The inertial force sensor as above has the respective blocks connected by the connector. Due to this, relative positions of the respective blocks, that is, relative positions of the single-axis inertial force sensors can be positioned precisely at their designed values. The inertial force sensor has the respective single-axis inertial force sensors arranged on the inclined surfaces of the blocks, with the first and second blocks arranged along the first direction and the third and fourth blocks arranged along the second direction (direction orthogonal to the first direction). Due to this, the inertial force sensor can detect 3-axis angular velocity.

Figure 10:
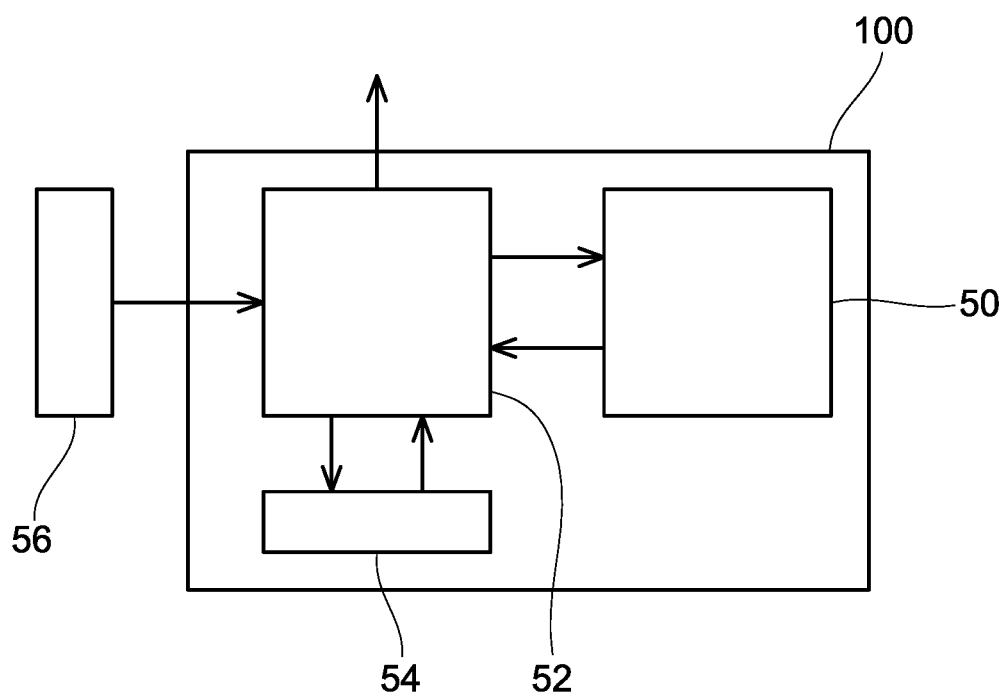

FIG. 10 schematically shows an internal configuration of the inertial force sensor.

Figure 11:
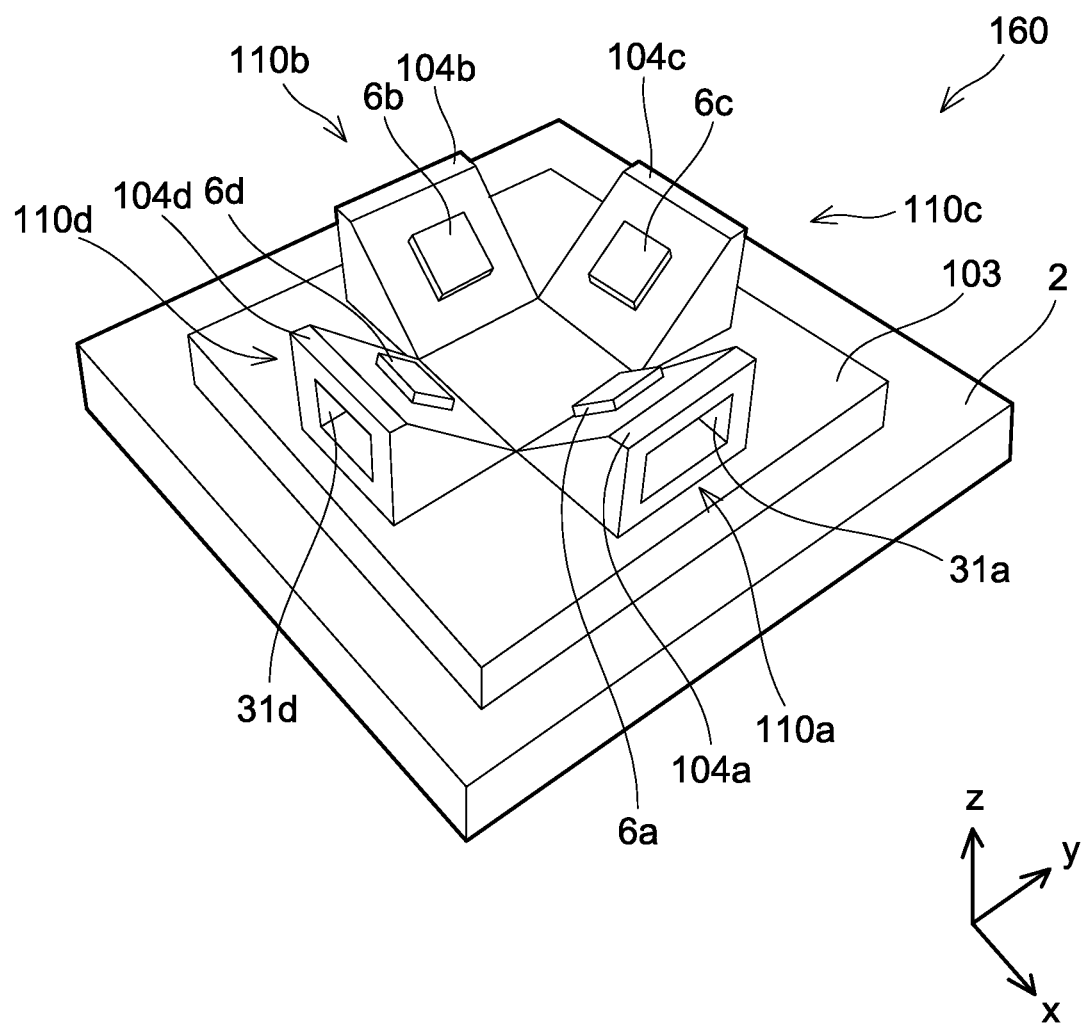

FIG. 11 shows a perspective view of an inertial force sensor of a second embodiment.

FIG. 12A to 12F show shapes of respective surfaces of a block.

Figure 13:
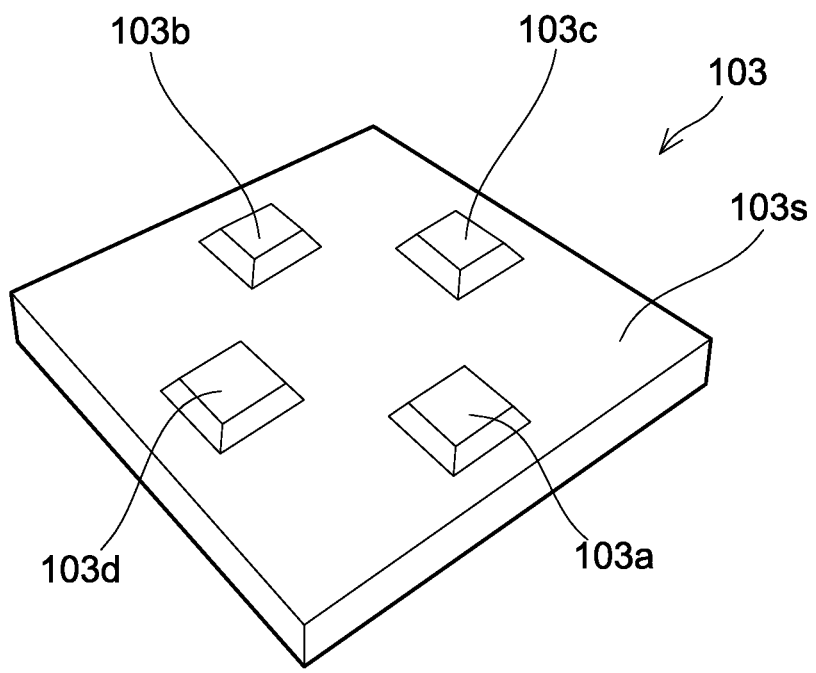

FIG. 13 shows a perspective view of a connector.

Figure 14:
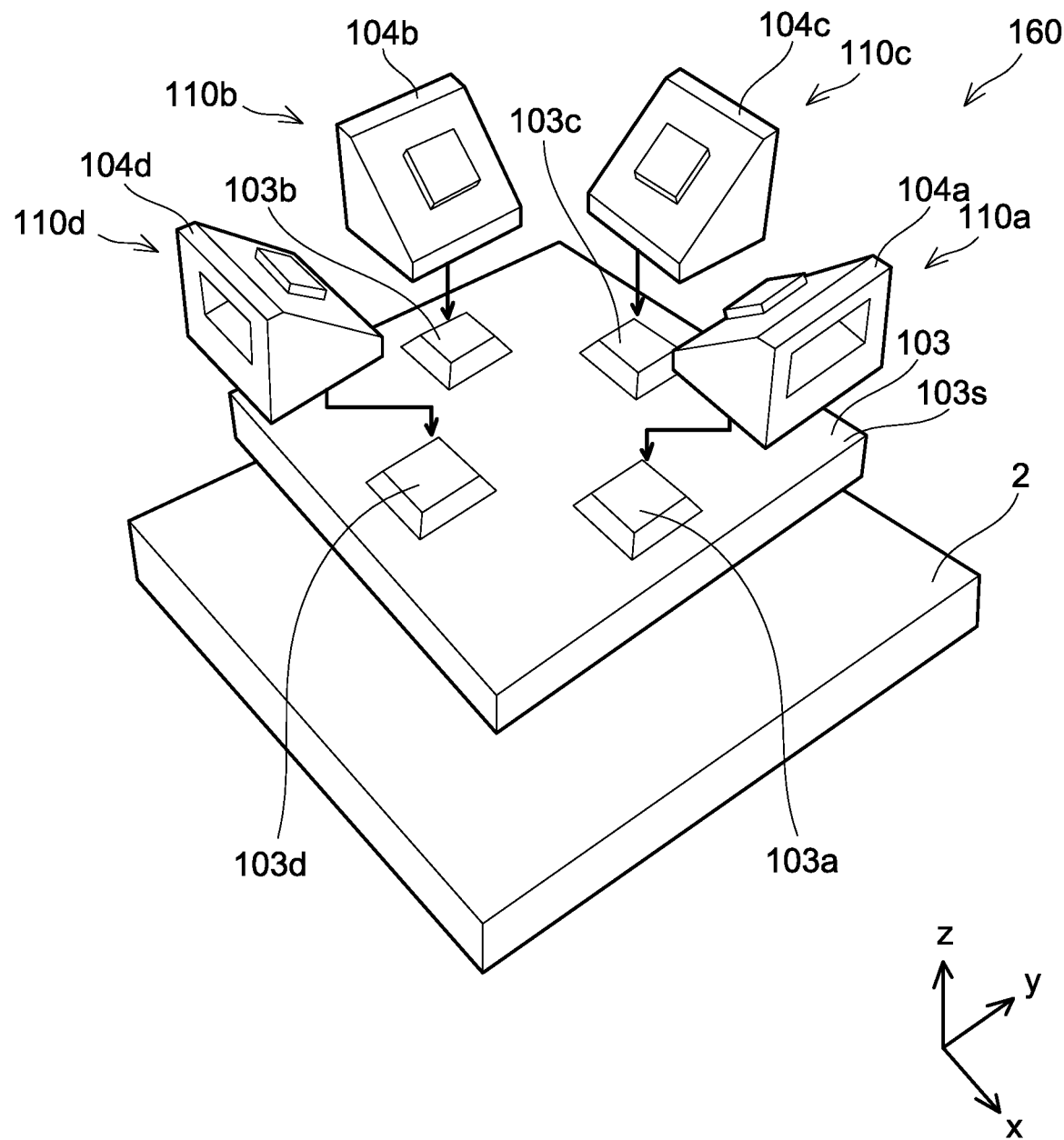

FIG. 14 shows how block sensors are connected to the connector.

Figure 15:
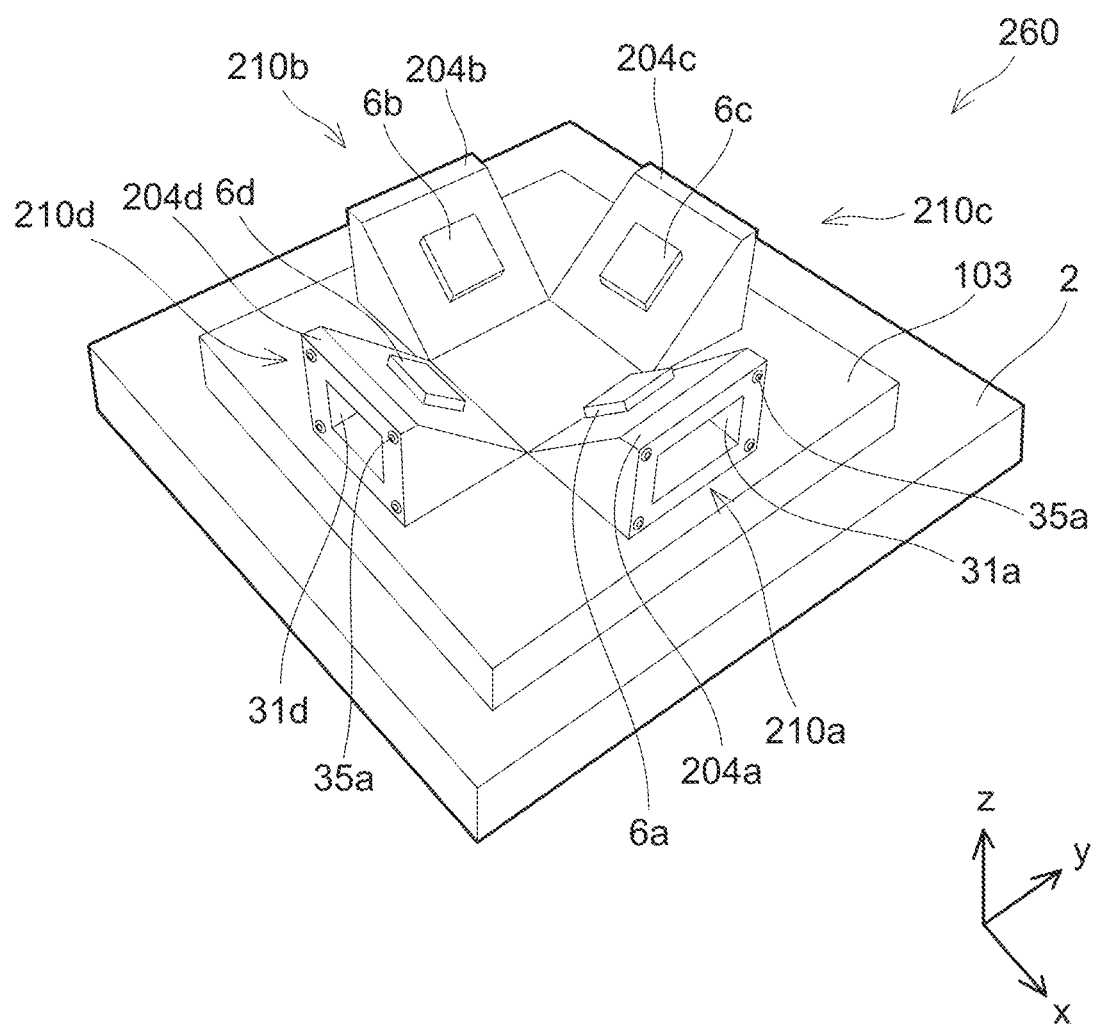

FIG. 15 shows a perspective view of an inertial force sensor of a third embodiment.

FIG. 16A to 16F show shapes of respective surfaces of a block.

Figure 17:
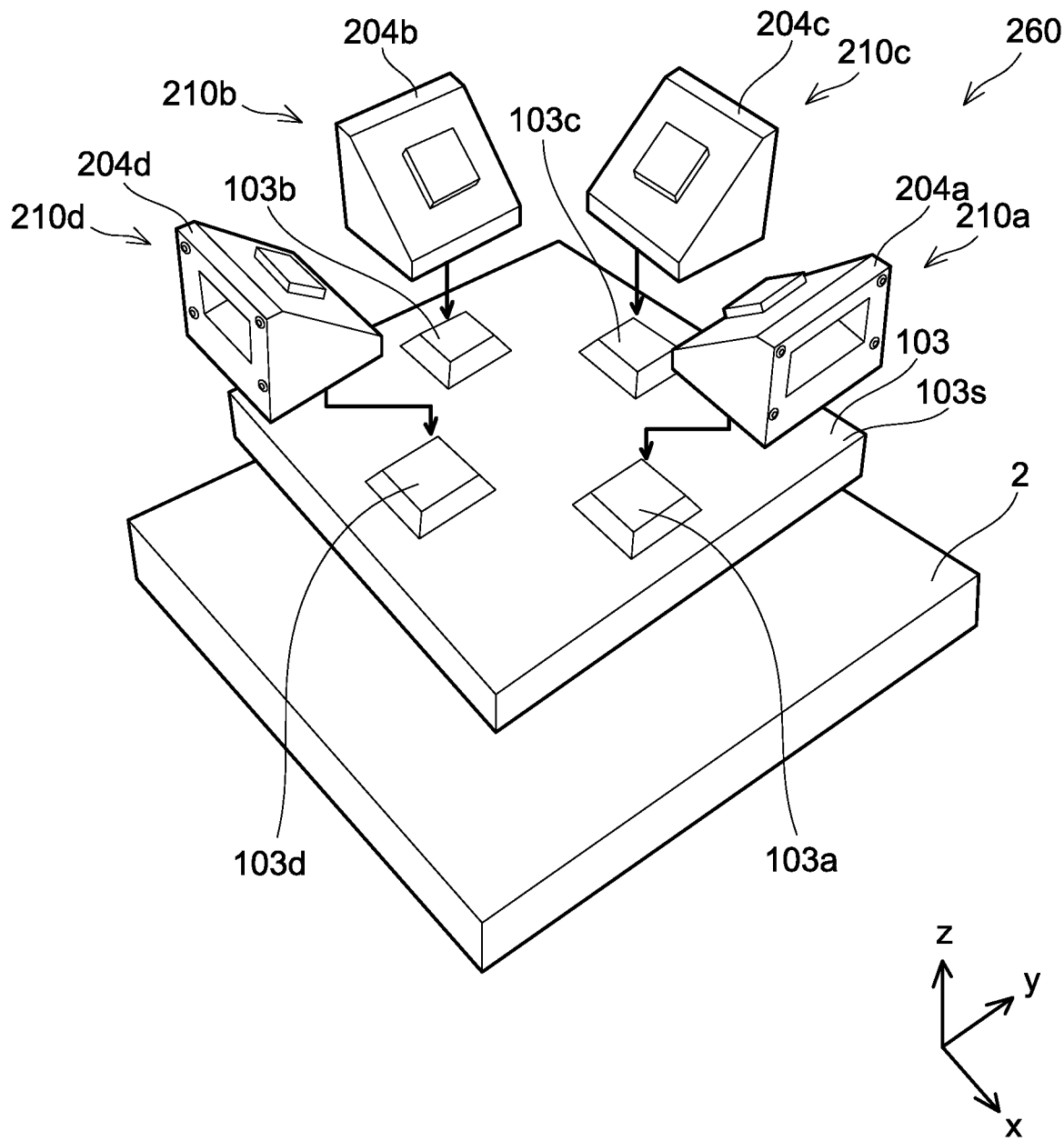

FIG. 17 shows how block sensors are connected to a connector.

Figure 18:
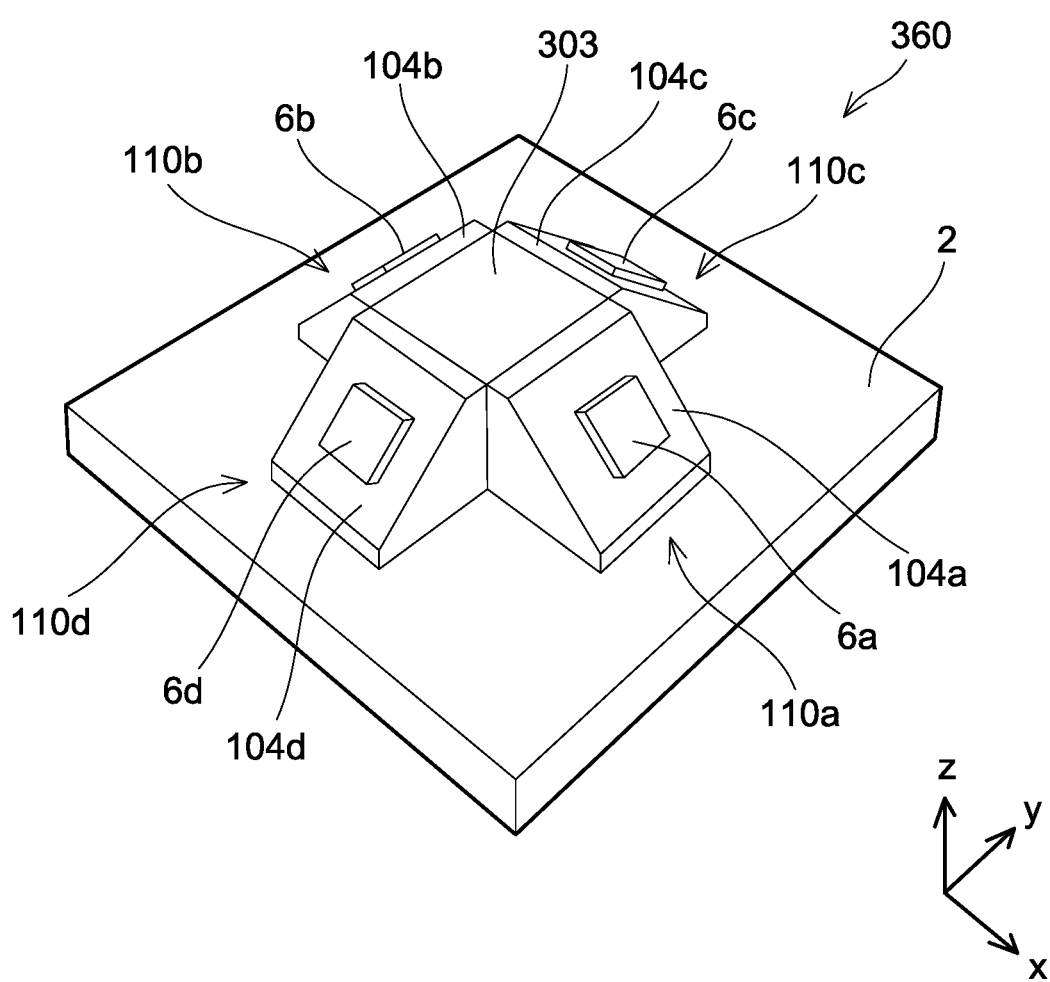

FIG. 18 shows a perspective view of an inertial force sensor of a fourth embodiment.

Figure 19:
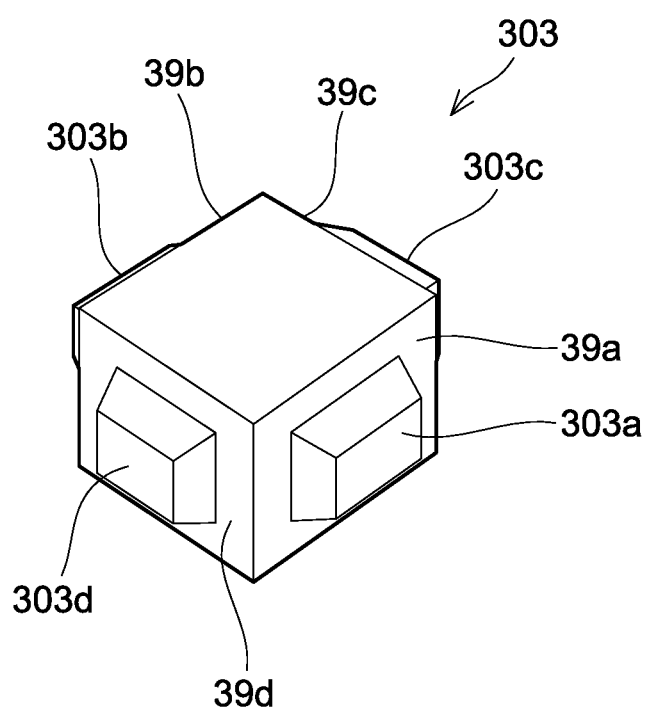

FIG. 19 shows a perspective view of a connector.

Figure 20:
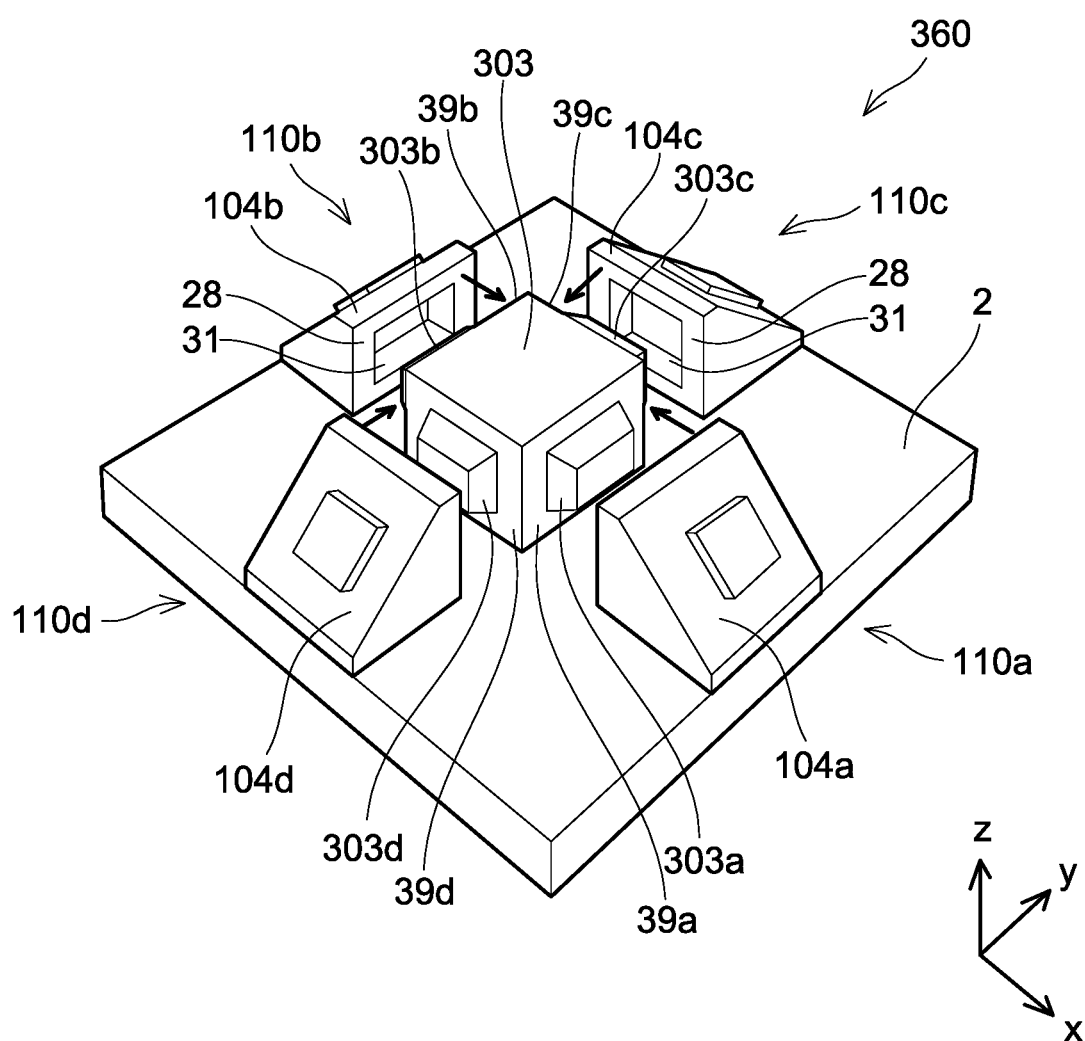

FIG. 20 shows how block sensors are connected to the connector.

Figure 21:
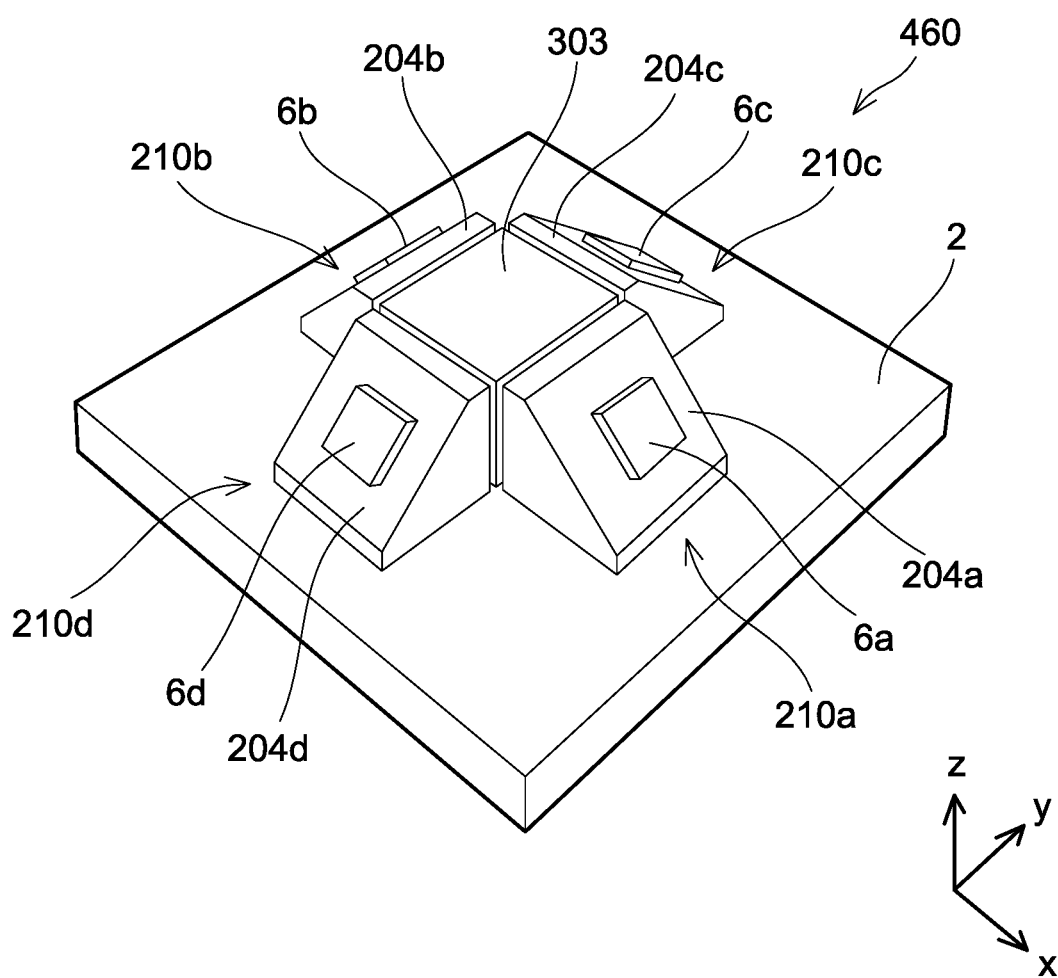

FIG. 21 shows a perspective view of an inertial force sensor of a fifth embodiment.

Figure 22:
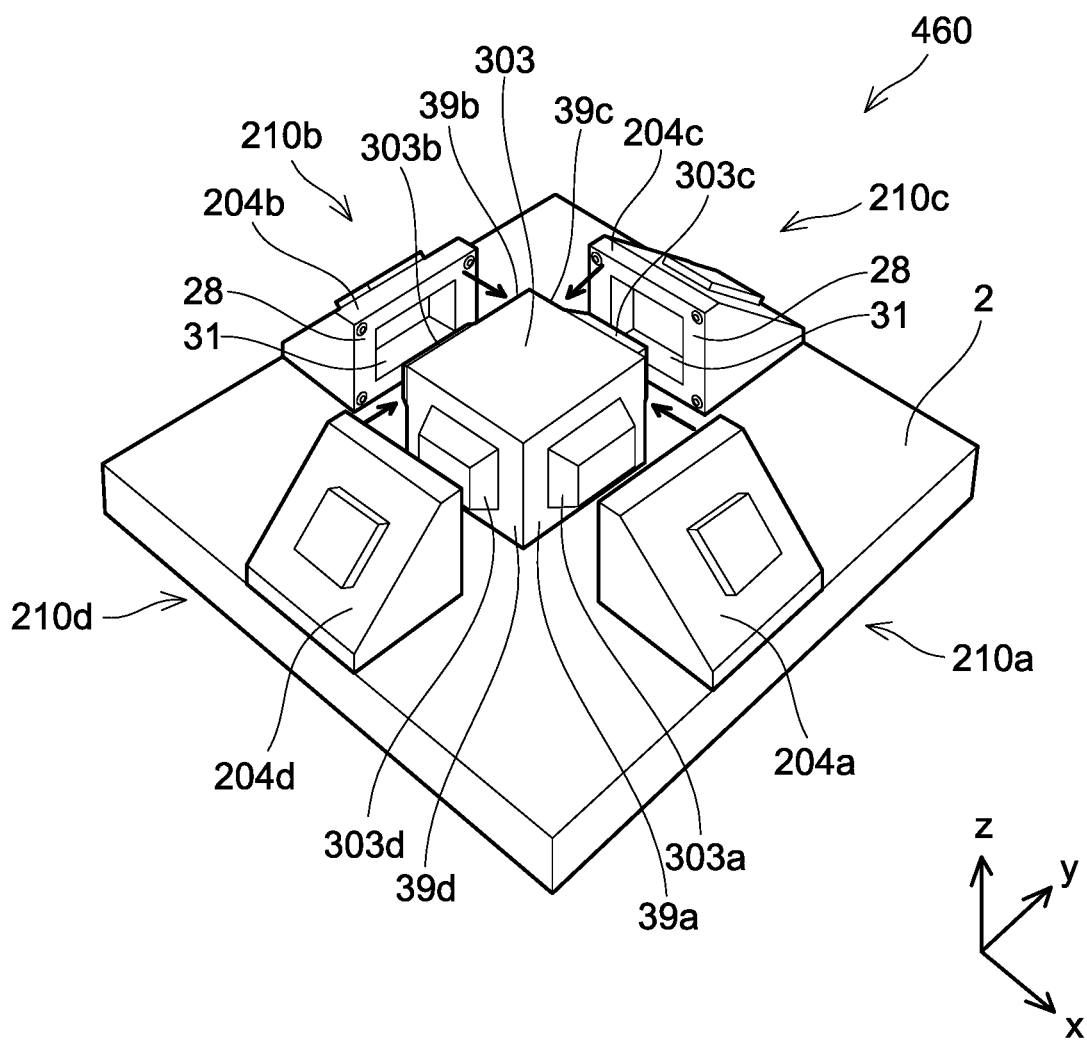

FIG. 22 shows how block sensors are connected to a connector.

Figure 23:
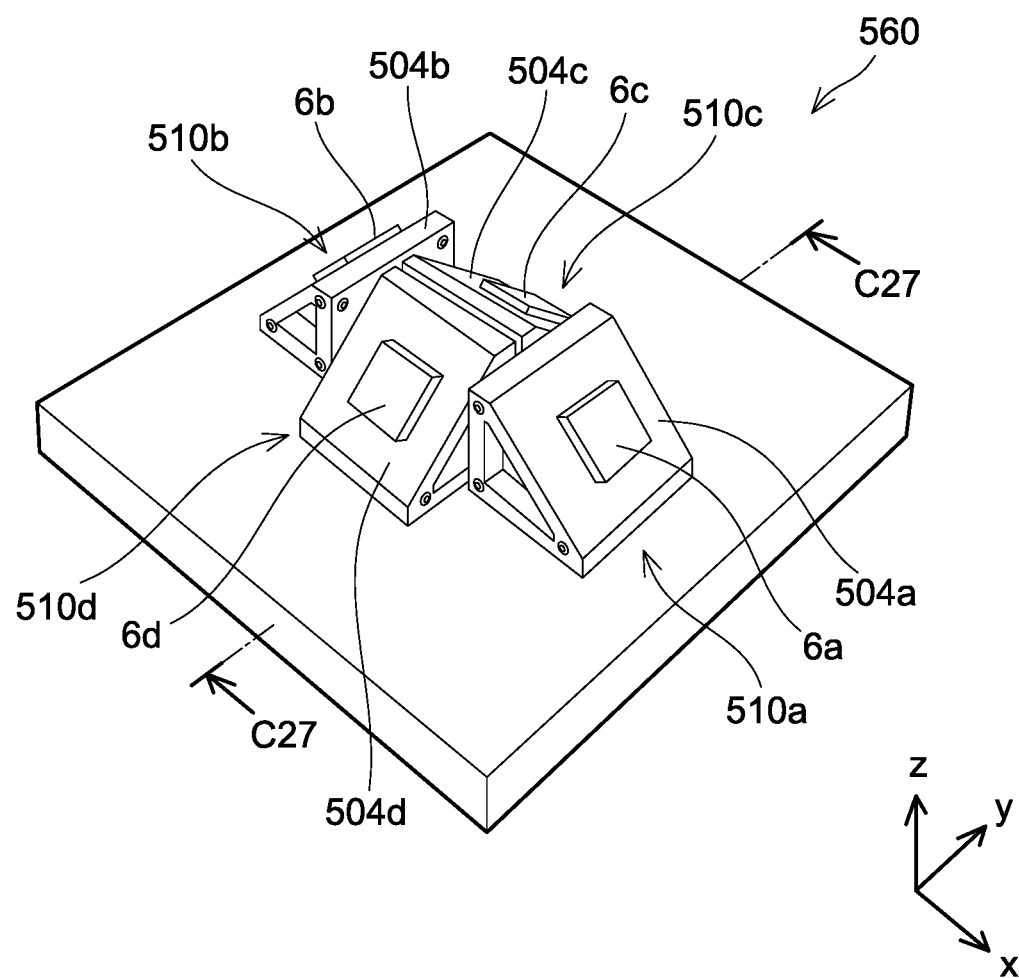

FIG. 23 shows a perspective view of an inertial force sensor of a sixth embodiment.

FIG. 24A to 24F show shapes of respective surfaces of a block.

Figure 25:
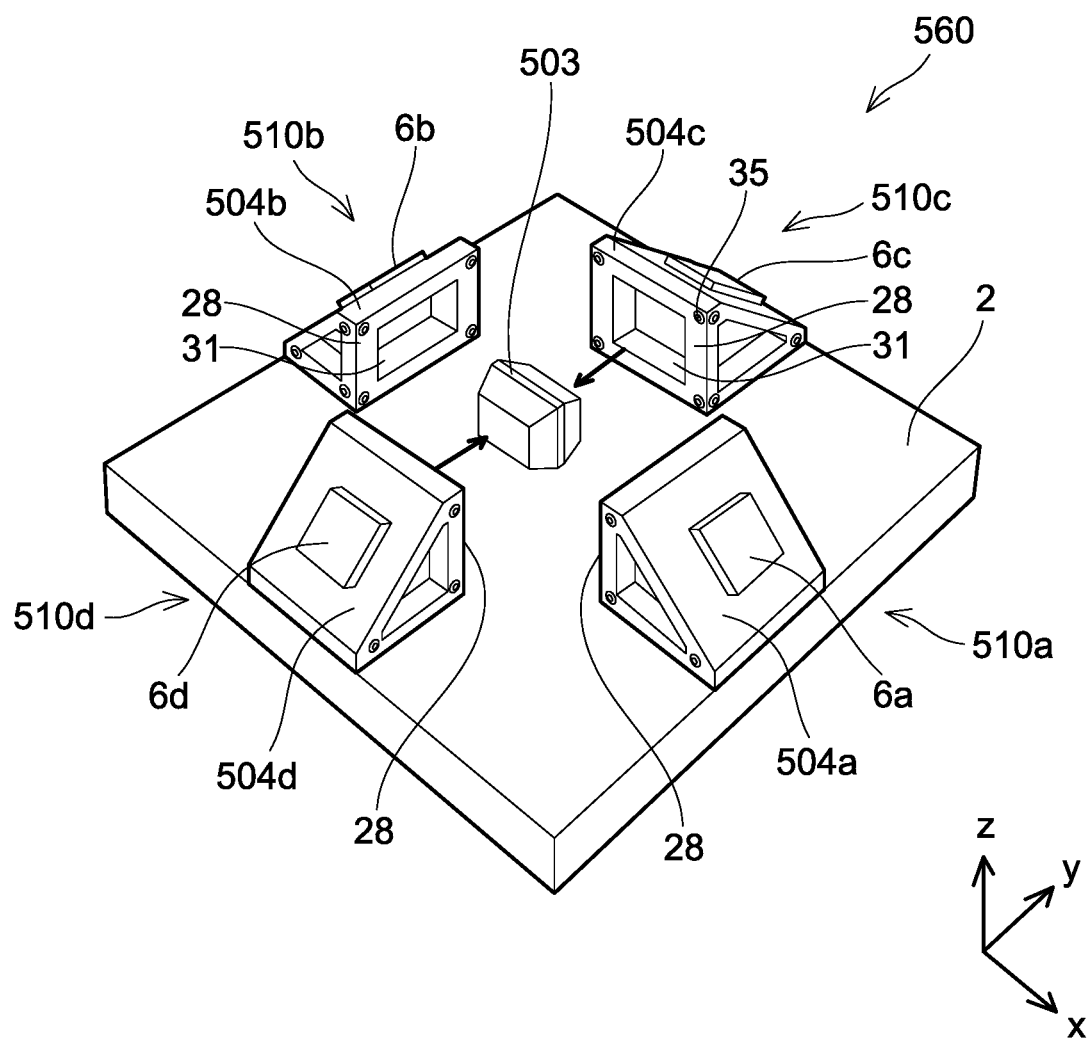

FIG. 25 shows how block sensors are connected to a connector.

Figure 26:
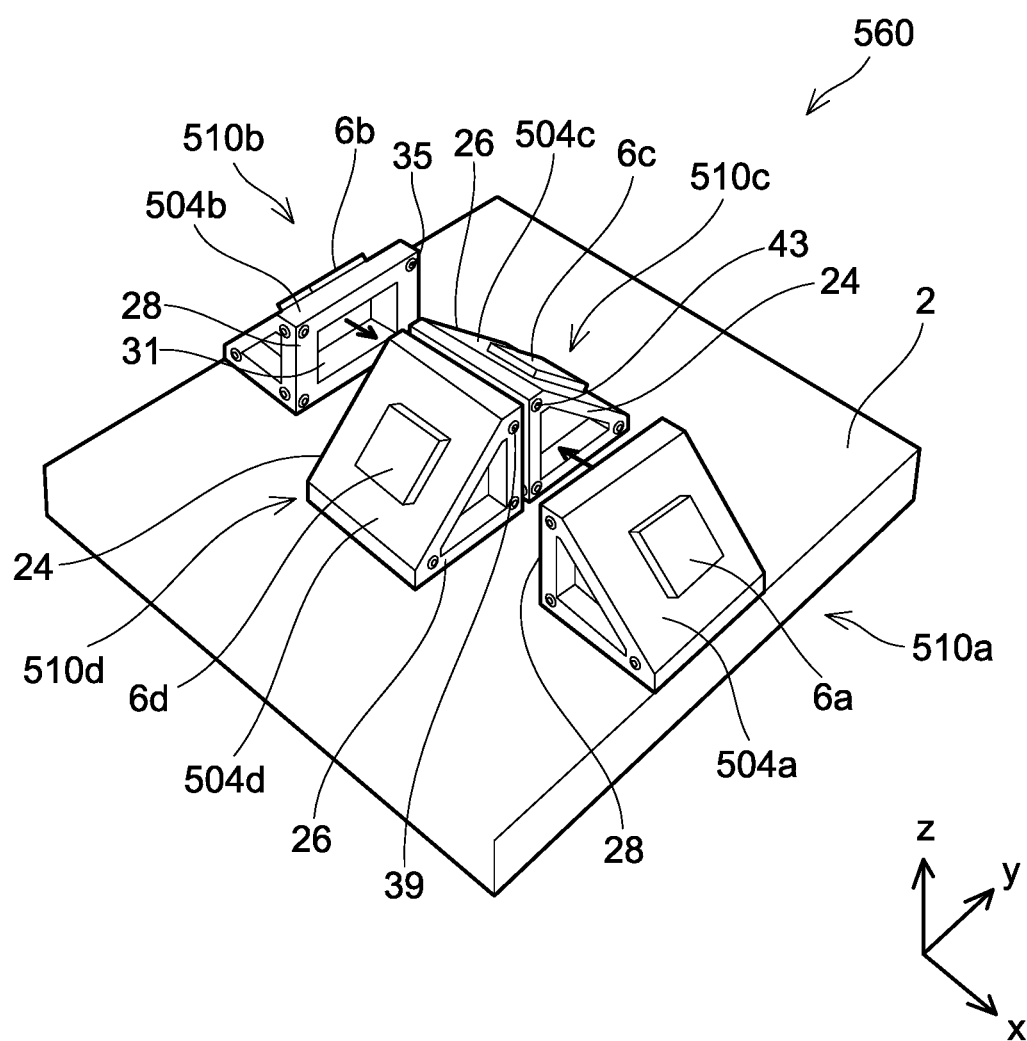

FIG. 26 shows how the block sensors are connected to the connector.

Figure 27:
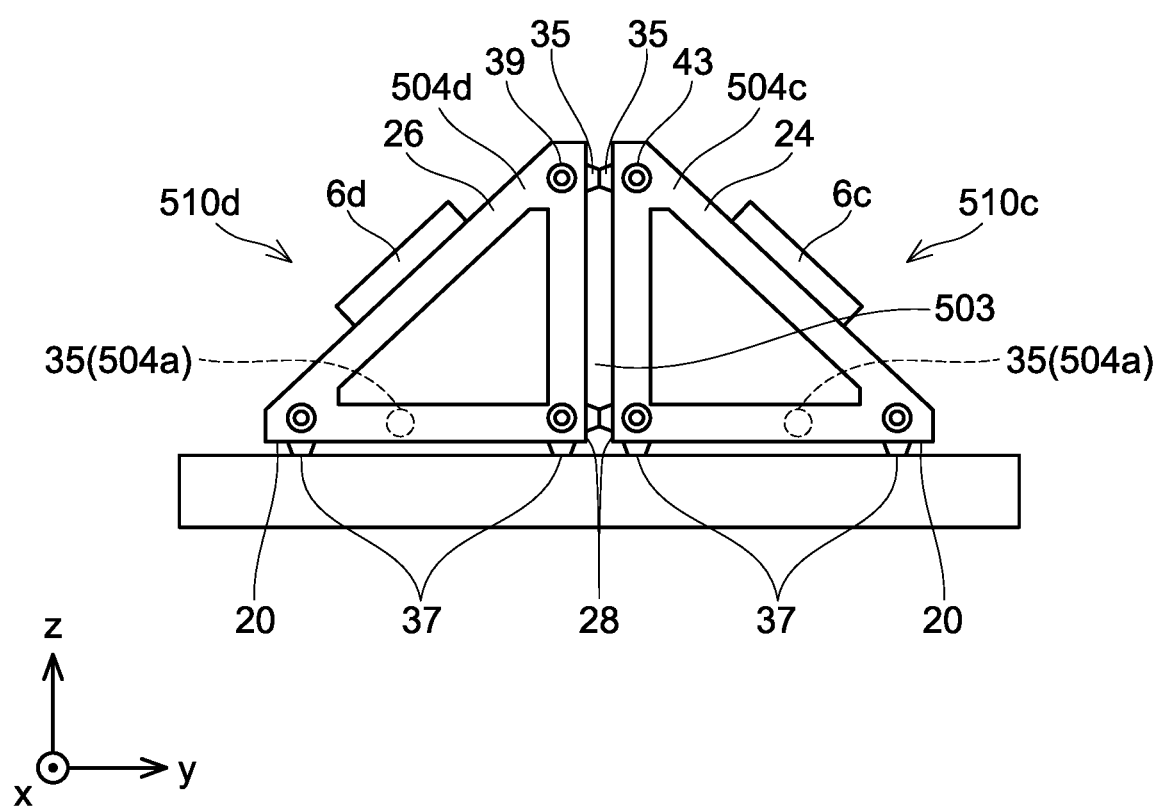

FIG. 27 is a cross-sectional view along a line C27-C27 in FIG. 23, and is a diagram explaining a contact state of the block sensors in detail.

Figure 28:
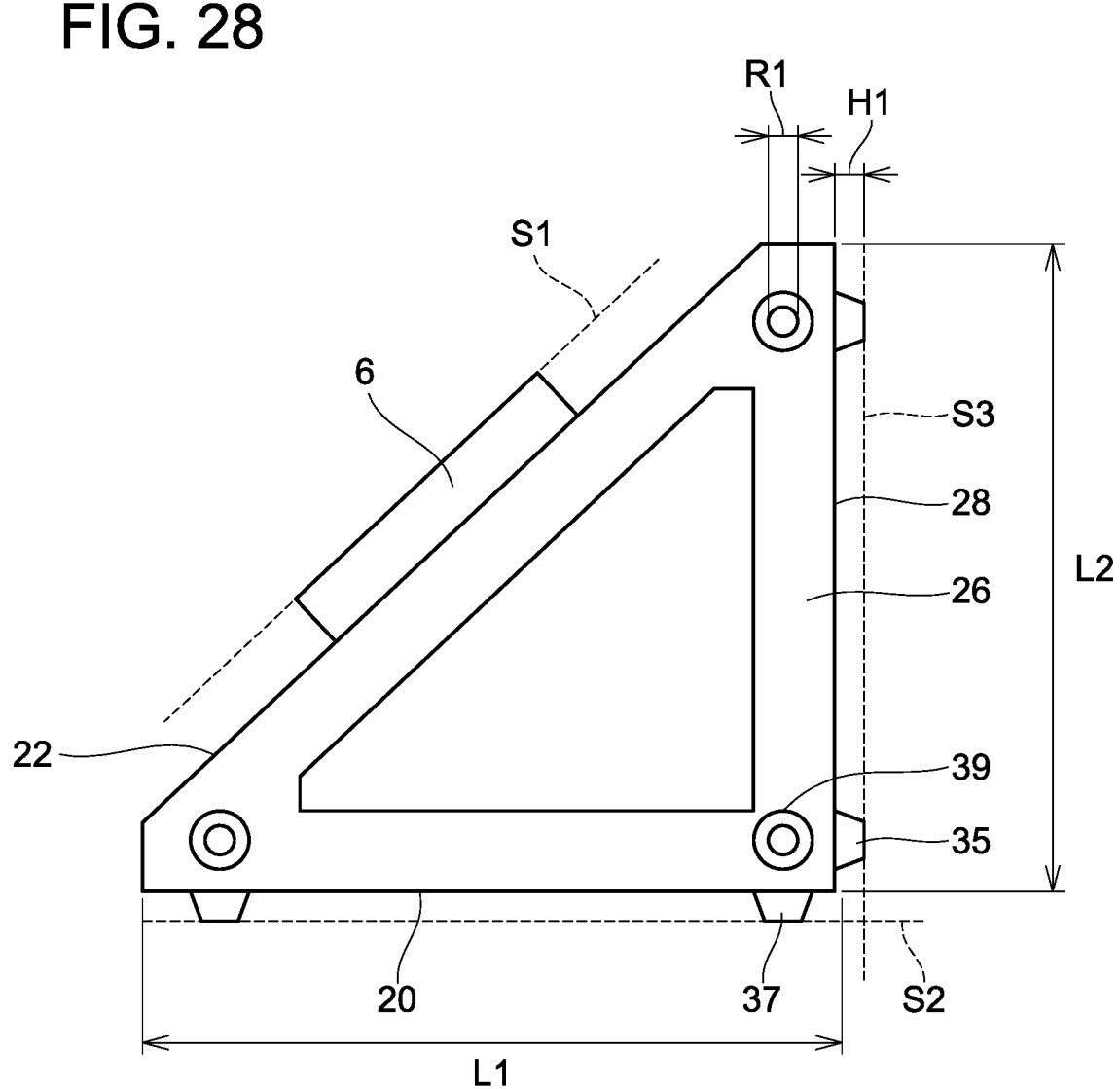

FIG. 28 is a diagram for explaining a portion measured in surface precision measurement.

Figure 29:
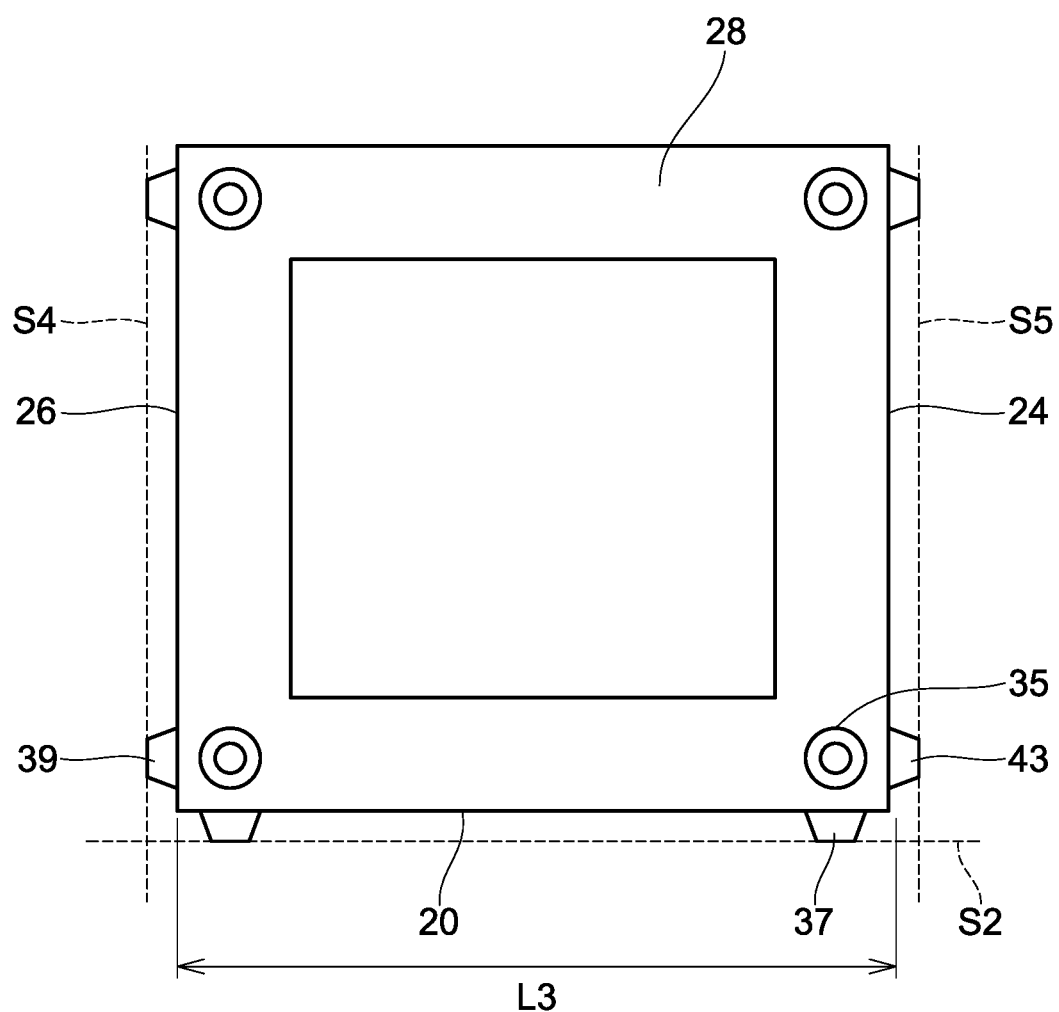

FIG. 29 is a diagram for explaining the portion measured in the surface precision measurement.

FIG. 30 shows results of the surface precision measurement.

Figure 31:
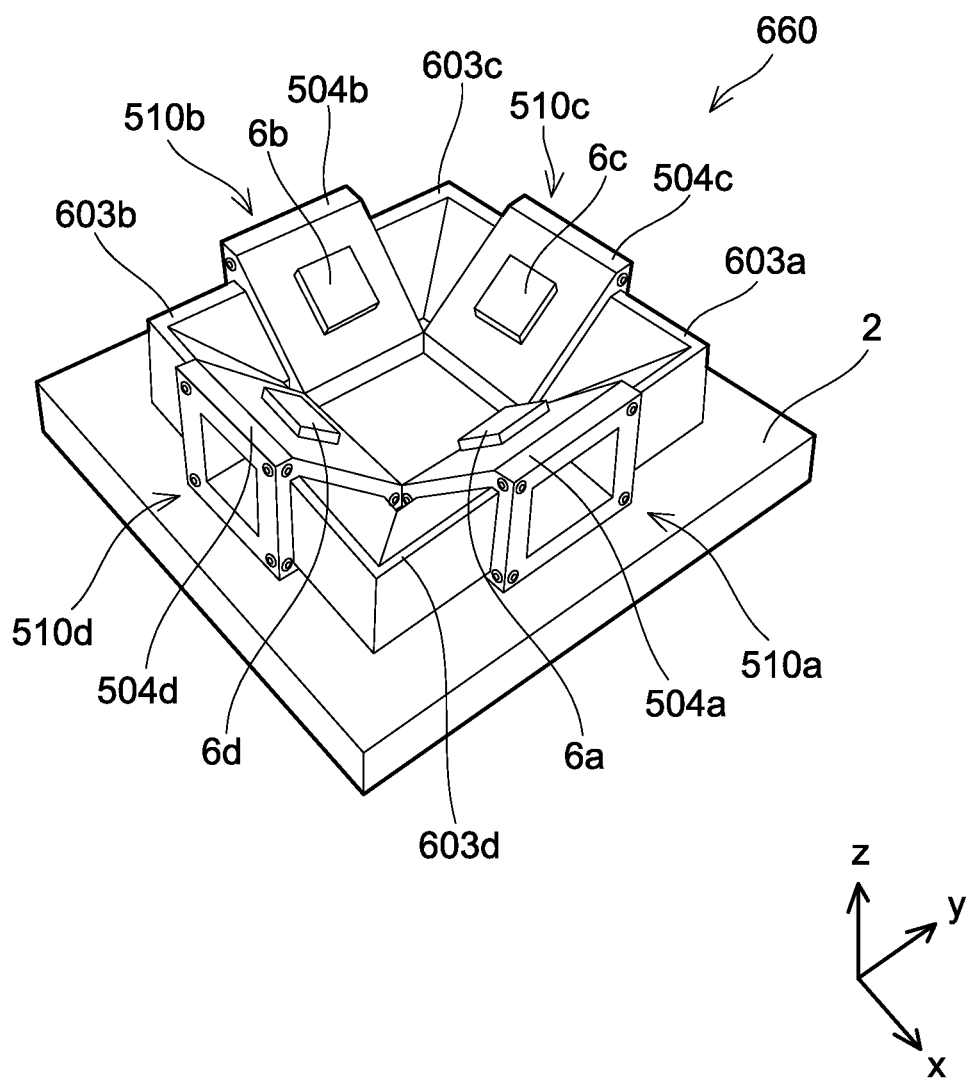

FIG. 31 shows a perspective view of an inertial force sensor of a seventh embodiment.

Figure 32:
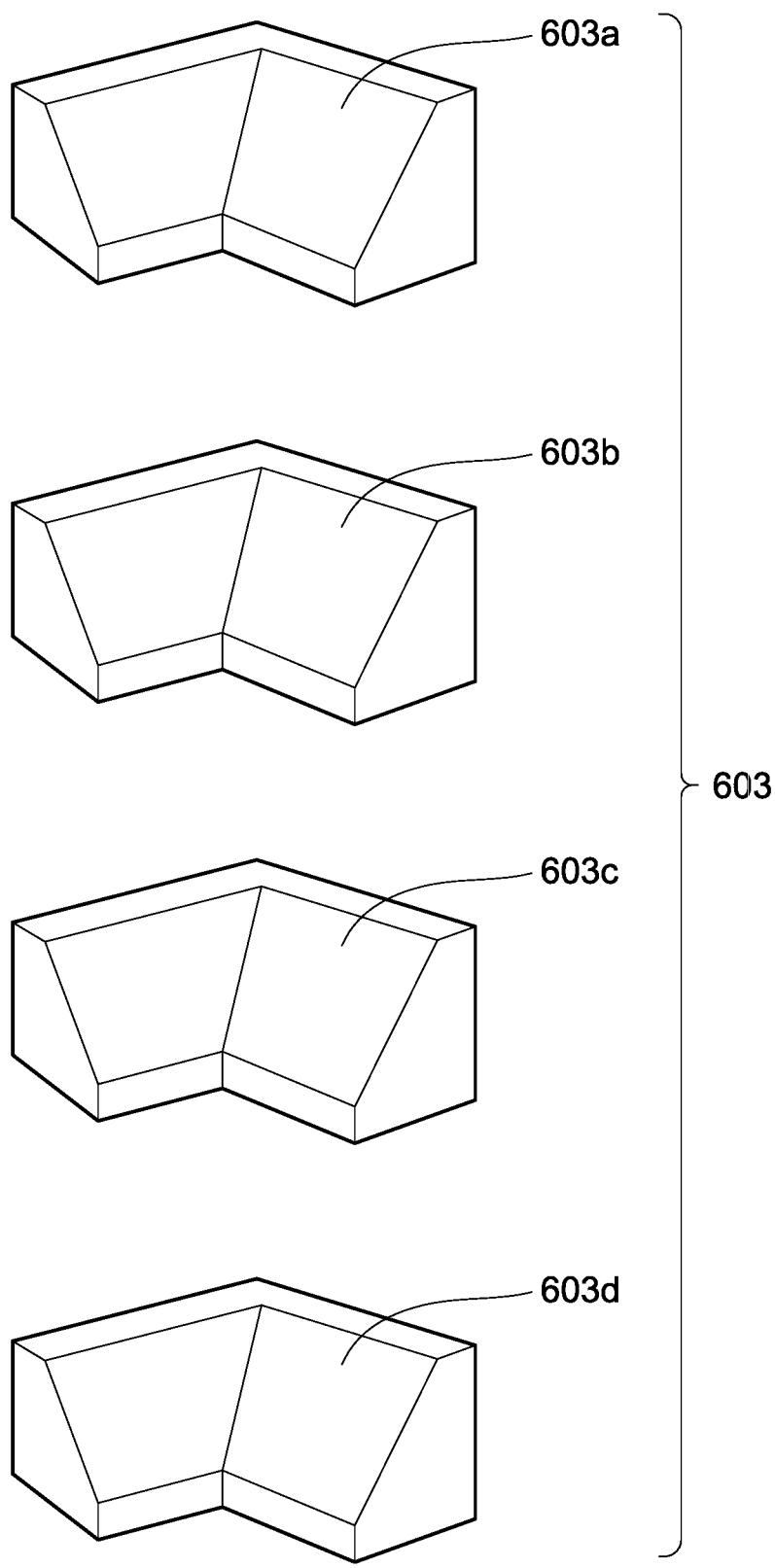

FIG. 32 shows a perspective view of a connector.

Figure 33:
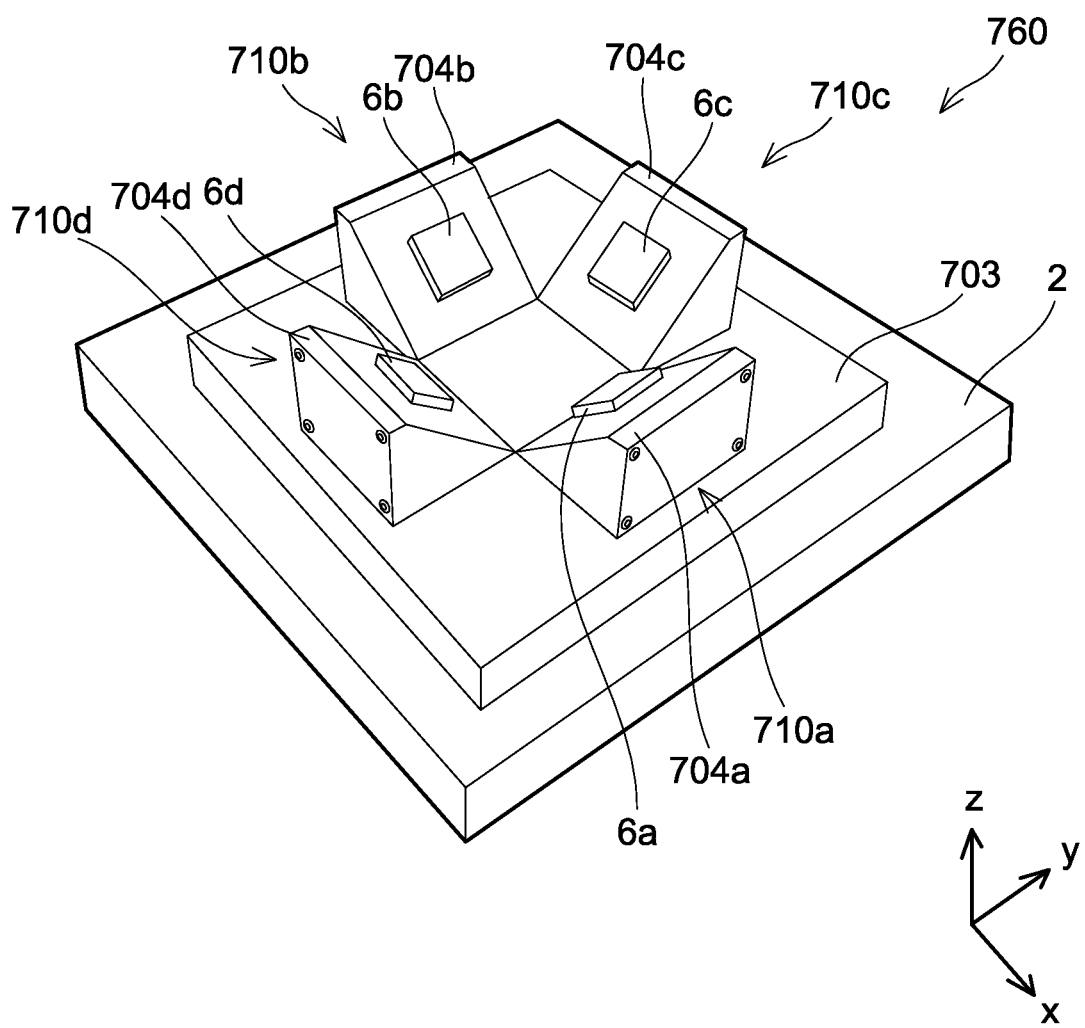

FIG. 33 shows a perspective view of an inertial force sensor of an eighth embodiment.

FIG. 34A to 34F show shapes of respective surfaces of a block.

Figure 35:
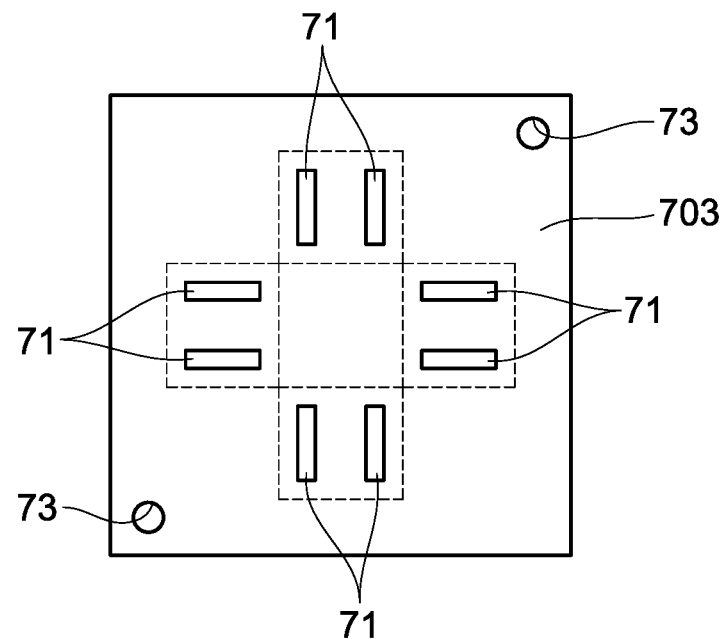

FIG. 35 shows a plan view of a connector.

Figure 36:
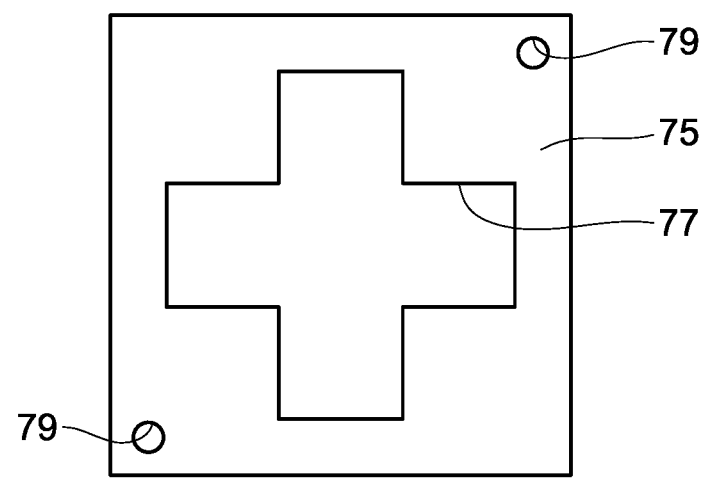

FIG. 36 shows a plan view of a supporting jig.

Figure 37:
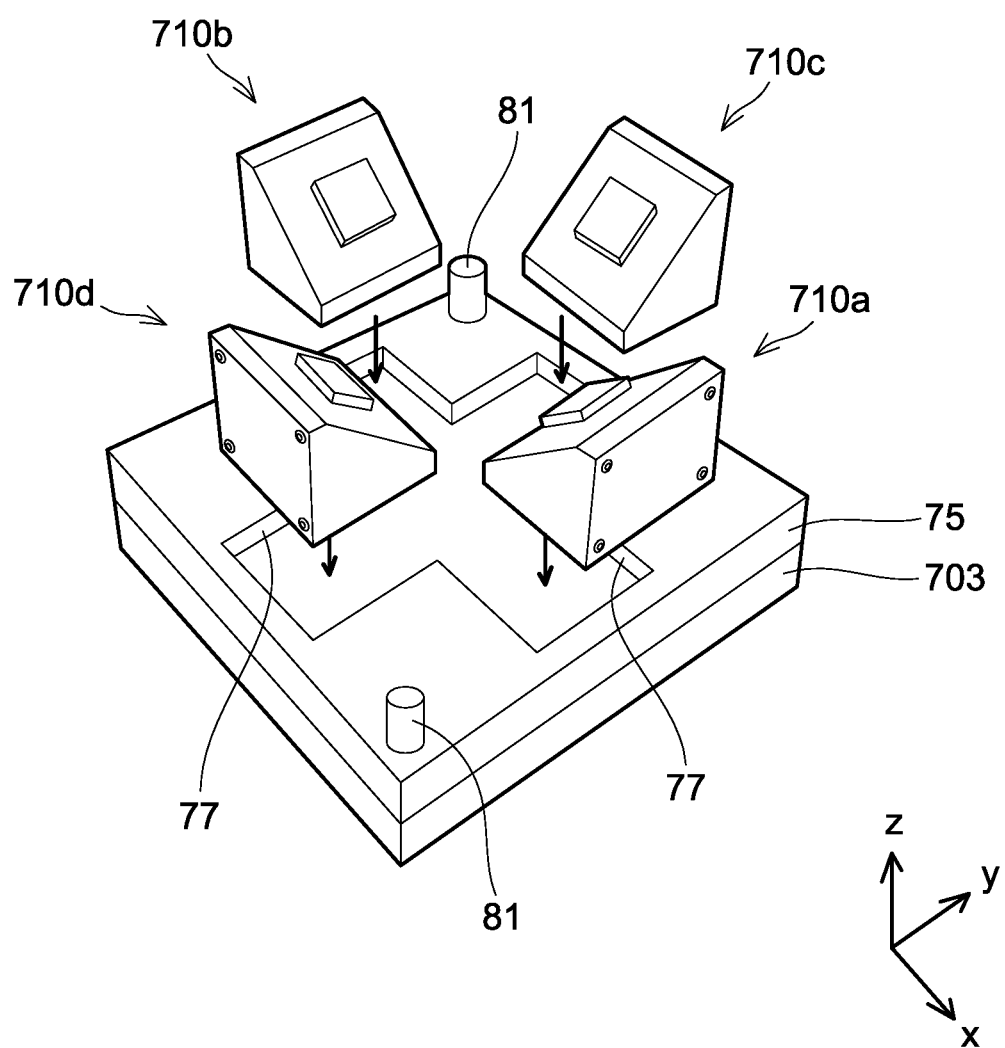

FIG. 37 shows how block sensors are connected to the connector.

EMBODIMENT

An aspect of an inertial force sensor disclosed herein may comprise: a base; a first block mounted on the base and including an inclined surface that is inclined with respect to a surface of the base and a recess defined on a surface different from the inclined surface; a second block mounted on the base and including an inclined surface that is inclined with respect to the surface of the base and a recess defined on a surface different from the inclined surface; a third block mounted on the base and including an inclined surface that is inclined with respect to the surface of the base and a recess defined on a surface different from the inclined surface; a fourth block mounted on the base and including an inclined surface that is inclined with respect to the surface of the base and a recess defined on a surface different from the inclined surface; a first single-axis inertial force sensor arranged on the inclined surface of the first block; a second single-axis inertial force sensor arranged on the inclined surface of the second block; a third single-axis inertial force sensor arranged on the inclined surface of the third block; a fourth single-axis inertial force sensor arranged on the inclined surface of the fourth block; a connector including projections configured to fit the recesses of the first, second, third, and fourth blocks and configured to physically connect the first, second, third, and fourth blocks; and a circuit arithmetic processing and output module configured to execute an arithmetic algorithm that processes an output from each of the single-axis inertial force sensors and an output algorithm that outputs multiple-axis inertial force obtained by the arithmetic algorithm, wherein the first and second blocks are aligned along a first direction parallel to the surface of the base with their inclined surfaces both facing inward or both facing outward, and the third and fourth blocks are aligned along a second direction parallel to the surface of the base and orthogonal to the first direction with their inclined surfaces both facing inward or both facing outward.

This inertial force sensor fixes the respective blocks to the connector by fitting the recesses arranged on the blocks to the projections arranged on the connector. As a result, the respective blocks are connected by the connector and the relative positions of the respective blocks (relative positions of the single-axis inertial force sensors) can be positioned precisely at their designed values. This inertial force sensor also has the respective single-axis inertial force sensors arranged on the inclined surfaces of the blocks, with the first and second blocks arranged along the first direction and the third and fourth blocks arranged along the second direction (direction orthogonal to the first direction). Due to this, the inertial force sensor can detect 3-axis angular velocity.

An aspect of an inertial force sensor disclosed herein may comprise: a base; a first block mounted on the base and including an inclined surface that is inclined with respect to a surface of the base, and a recess and a reference projection arranged on a surface different from the inclined surface; a second block mounted on the base and including an inclined surface that is inclined with respect to the surface of the base, and a recess and a reference projection arranged on a surface different from the inclined surface; a third block mounted on the base and including an inclined surface that is inclined with respect to the surface of the base, and a recess and a reference projection arranged on a surface different from the inclined surface; a fourth block mounted on the base and including an inclined surface that is inclined with respect to the surface of the base, and a recess and a reference projection arranged on a surface different from the inclined surface; a first single-axis inertial force sensor arranged on the inclined surface of the first block; a second single-axis inertial force sensor arranged on the inclined surface of the second block; a third single-axis inertial force sensor arranged on the inclined surface of the third block; a fourth single-axis inertial force sensor arranged on the inclined surface of the fourth block; a connector including projections configured to fit the recesses of two of the first, second, third, and fourth blocks and configured to physically connect the blocks; and a circuit arithmetic processing and output module configured to execute an arithmetic algorithm that processes an output from each of the single-axis inertial force sensors and an output algorithm that outputs multiple-axis inertial force obtained by the arithmetic algorithm, wherein the first and second blocks are aligned along a first direction parallel to the surface of the base with their inclined surfaces both facing inward or both facing outward, and the third and fourth blocks are aligned along a second direction parallel to the surface of the base and orthogonal to the first direction with their inclined surfaces both facing inward or both facing outward.

This inertial force sensor also fixes the respective blocks to the connector by fitting the recesses arranged on the blocks to the projections arranged on the connector, by which the relative positions of the respective blocks (relative positions of the single-axis inertial force sensors) can be positioned precisely at their designed values. Further, this inertial force sensor has the reference projections arranged on the respective blocks. Due to this, when the blocks are fixed by the connector, a contact area between the surface of each block where the reference projection is arranged and the connector or another block can be reduced. As a result, even if surface precision of a surface of a counterpart contacting each block is low, the blocks can be made more robust against the influence of such low surface precision. That is, the blocks can be positioned with high accuracy regardless of the surface precision of the surfaces of the counterparts thereof contacting the respective blocks. Further, the inertial force sensor as above also has the respective single-axis inertial force sensors arranged on the inclined surfaces of the blocks, with the first and second blocks arranged along the first direction and the third and fourth blocks arranged along the second direction (direction orthogonal to the first direction). Due to this, the inertial force sensor can detect 3-axis angular velocity.

In the inertial force sensor as above, the reference projections may be in contact with a surface of the connector. The positions of the blocks thereby become more robust against the influence of surface precision of the surface of the connector, and the position of the blocks can be performed with high accuracy. Alternatively, the reference projections may each be in contact with the reference projection of another block. In other words, the blocks may be in contact with each other via their reference projections. In this case, the positions of the blocks become more robust against the influence of surface precision of the surfaces of the blocks, and the position of the blocks can be performed with high accuracy. In the inertial force sensor as above, three or more reference projections may be arranged on the surface of each block. Since each block contact the surface of its contact counterpart at three or more points, the positions of the blocks are thereby stabilized.

In the above inertial force sensor, the connector may be configured of a first connector, a second connector, a third connector, and a fourth connector. The first connector may connect the first and third blocks, the second connector may connect the second and fourth blocks, the third connector may connect the third and second blocks, and the fourth connector may connect the fourth and first blocks. Even with a configuration that uses a plurality of (four) connectors, the relative positions of the blocks can be positioned precisely as their designed values.

An aspect of an inertial force sensor disclosed herein may comprise: a base; a first block mounted on the base and including an inclined surface that is inclined with respect to a surface of the base and a metal pad arranged on a surface different from the inclined surface; a second block mounted on the base and including an inclined surface that is inclined with respect to the surface of the base and a metal pad arranged on a surface different from the inclined surface; a third block mounted on the base and including an inclined surface that is inclined with respect to the surface of the base and a metal pad arranged on a surface different from the inclined surface; a fourth block mounted on the base and including an inclined surface that is inclined with respect to the surface of the base and a metal pad arranged on a surface different from the inclined surface; a first single-axis inertial force sensor arranged on the inclined surface of the first block; a second single-axis inertial force sensor arranged on the inclined surface of the second block; a third single-axis inertial force sensor arranged on the inclined surface of the third block; a fourth single-axis inertial force sensor arranged on the inclined surface of the fourth block; a connector including metal connection pads configured to be welded to the metal pad of each block and configured to physically connect the first, second, third, and fourth blocks; and a circuit arithmetic processing and output module configured to execute an arithmetic algorithm that processes an output from each of the single-axis inertial force sensors and an output algorithm that outputs multiple-axis inertial force obtained by the arithmetic algorithm, wherein the first and second blocks are aligned along a first direction parallel to the surface of the base with their inclined surfaces both facing inward or both facing outward, and the third and fourth blocks are aligned along a second direction parallel to the surface of the base and orthogonal to the first direction with their inclined surfaces both facing inward or both facing outward.

The above inertial force sensor also has the respective blocks connected by the connector. Due to this, the relative positions of the blocks, that is, the relative positions of the single-axis inertial force sensors can be positioned precisely as their designed values. Further, since the metal pads and the connection pads are welded, each block can be firmly fixed to the connector. The relative positions of the blocks can be suppressed from being displaced after having connected the blocks to the connector (after the blocks have been positioned). The inertial force sensor has the respective single-axis inertial force sensors arranged on the inclined surfaces of the blocks, with the first and second blocks arranged along the first direction and the third and fourth blocks arranged along the second direction (direction orthogonal to the first direction). Due to this, the inertial force sensor can detect 3-axis angular velocity.

In the inertial force sensor as above, the first, second, third, and fourth blocks may have a same shape. Types of components of the inertial force sensor can be reduced, and manufacturing cost of the inertial force sensor can thereby be reduced.

In the inertial force sensor as above, the first, second, third, and fourth blocks may be constituted of a same resin material. By using the resin material, weight of each block is reduced, and weight of the inertial force sensor can be reduced. Further, by using the resin material, the blocks can be produced easily with high precision even if they have complicated shapes.

In the inertial force sensor as above, the connector may be constituted of a resin material that is a same material that constitute the blocks. The weight of the inertial force sensor can be reduced also by constituting the connector by the resin material. Further, the same material (resin material) may be used for the connector and the blocks, by which types of materials for producing the inertial force sensor can be reduced. The manufacturing cost of the inertial force sensor can thereby be reduced.

First Embodiment

Figure 1:
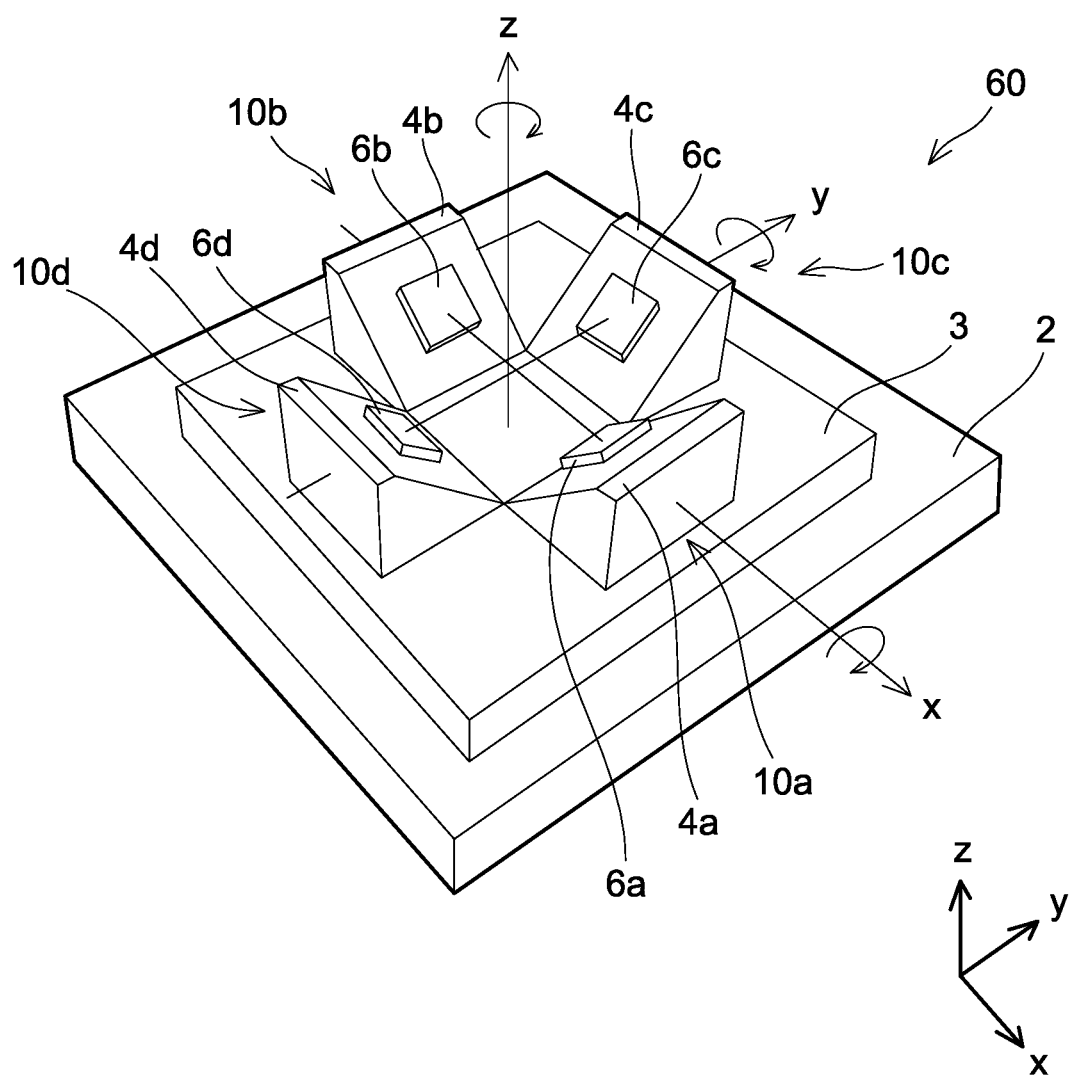
FIG. 1 shows a perspective view of an inertial force sensor of a first embodiment.

An inertial force sensor 60 will be described with reference to FIGS. 1 to 4. As shown in FIG. 1, the inertial force sensor 60 comprises a base 2, a connector 3, a first block sensor 10a, a second block sensor 10b, a third block sensor 10c, and a fourth block sensor 10d. The first block sensor 10a includes a first block 4a and a first gyro sensor 6a. The second block sensor 10b includes a second block 4b and a second gyro sensor 6b. The third block sensor 10c includes a third block 4c and a third gyro sensor 6c. The fourth block sensor 10d includes a fourth block 4d and a fourth gyro sensor 6d. The first gyro sensor 6a is an example of a first single-axis inertial force sensor, the second gyro sensor 6b is an example of a second single-axis inertial force sensor, the third gyro sensor 6c is an example of a third single-axis inertial force sensor, and the fourth gyro sensor 6d is an example of a fourth single-axis inertial force sensor. The block sensors 10a to 10d are fixed (mounted) on the connector 3. Further, the connector 3 is fixed (mounted) on a surface of the base 2. The blocks 4a to 4d are constituted of a same material, and the block sensors 10a to 10d have substantially same structure as each other. Although details will be described later, the inertial force sensor 60 is a 3-axis angular velocity sensor (gyroscope) configured to detect angular velocity about x axis, y axis, and z axis.

The surface of the base 2 is parallel to a x-y plane. Further, the first block sensor 10a and the second block sensor 10b are arranged along an x axis direction. The x axis direction is an example of a first direction. Specifically, these block sensors are arranged along the x axis direction with inclined surfaces 22 of the first block 4a and the second block 4b (see FIGS. 2A to 2F) both facing inward. Further, the third block sensor 10c and the fourth block sensor 10d are arranged along a y axis direction. The y axis direction is an example of a second direction. Specifically, these block sensors are arranged along the y axis direction with inclined surfaces 22 of the third block 4c and the fourth block 4d both facing inward.

As aforementioned, the block sensors 10a to 10d have substantially the same structure as each other. Due to this, in the below description, when features that are common among the block sensors 10a to 10d are to be explained, alphabetical part of the reference signs given to the block sensors 10a to 10d and the constituent members of the block sensors 10a to 10d may be omitted.

Figure 2A:
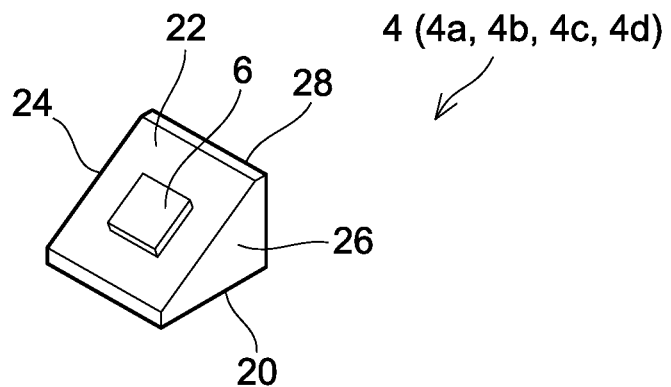
FIGS. 2A to 2F show shapes of respective surfaces of a block.
Figure 2B:
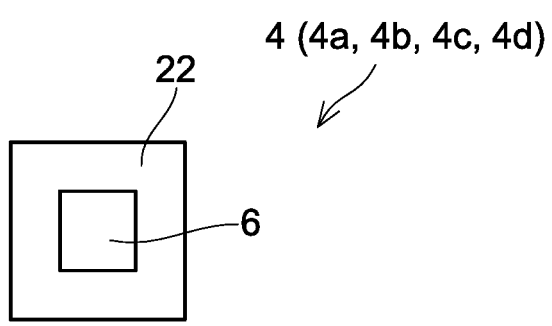
Figure 2C:
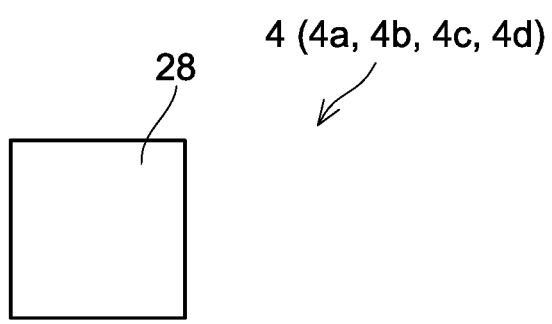
Figure 2D:
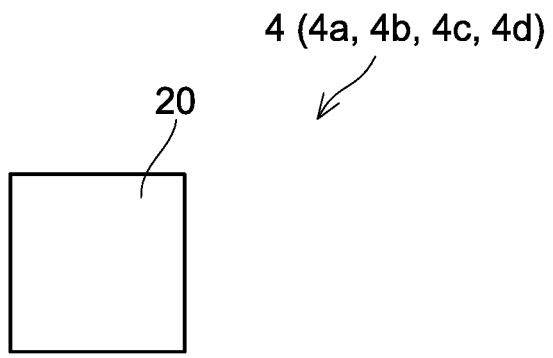
Figure 2E:
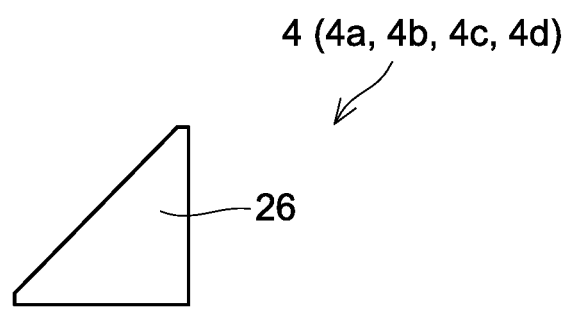
Figure 2F:
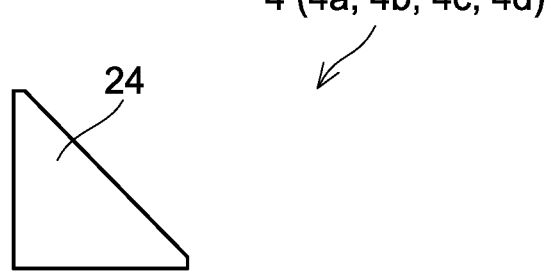

FIGS. 2A to 2F show respective surfaces of the block 4. FIG. 2A shows a perspective view, FIG. 2B shows a front view, FIG. 2C shows a rear view, FIG. 2D shows a bottom view, FIG. 2E shows a right side view, and FIG. 2F shows a left side view. The block 4 comprises a bottom surface 20 that contacts a surface of the connector 3, an inclined surface 22 that is inclined with respect to the bottom surface 20, a rear surface 28, a right side surface 26, and a left side surface 24 that are orthogonal to the bottom surface 20. The bottom surface 20, the inclined surface 22, and the rear surface 28 each have a square shape, and the right side surface 26 and the left side surface 24 each have a triangular shape. Specifically, the rear surface 28 includes one side of the bottom surface 20 and a side that is among four sides of the inclined surface 22 and being the farthest away from the bottom surface 20. The right side surface 26 and the left side surface 24 each include a side of the bottom surface 20 and a side that is among the four sides of the inclined surface 22 with a varying distance from the bottom surface 20. The gyro sensor 6 is arranged on the inclined surface 22. An inclination angle being a dihedral between the bottom surface 20 and the inclined surface 22 (inclined surface 22) is about 45 degrees. Further, the block 4 is constituted of Liquid Crystal Polymer (LCP) resin.

Figure 3:
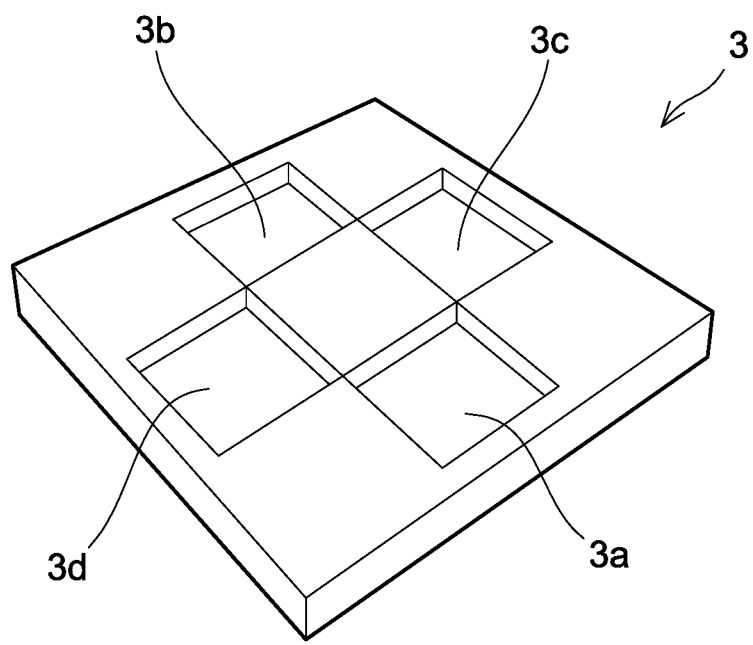
FIG. 3 shows a perspective view of a connector.
Figure 4:
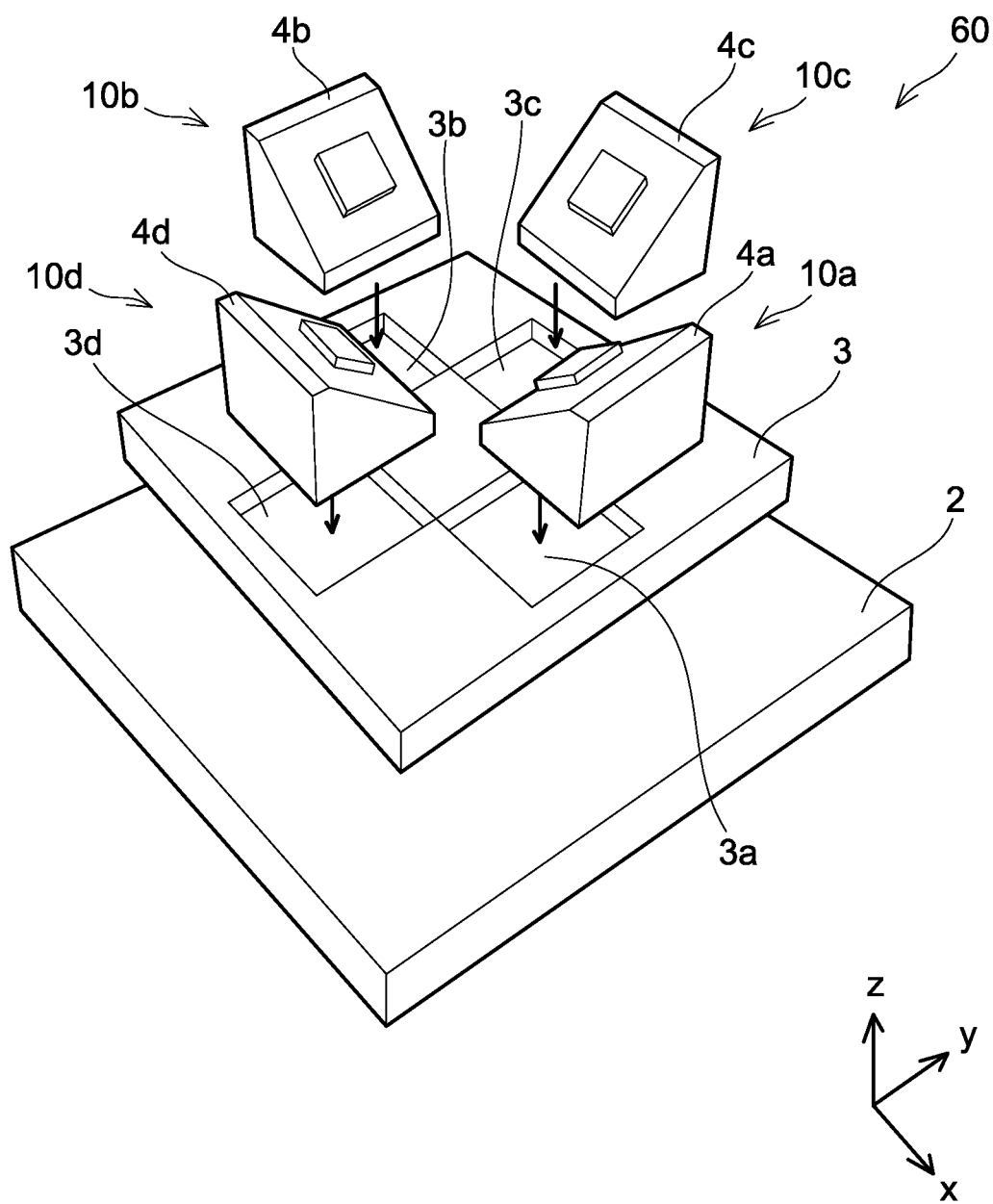
FIG. 4 shows how block sensors are connected to the connector.

FIG. 3 is a perspective view of the connector 3. The connector 3 comprises four recesses 3a to 3d. The recesses 3a to 3d are square and have a size that is equivalent to that of the bottom surfaces 20 of the blocks 4a to 4d. The first block 4a is fitted in the recess 3a, the second block 4b is fitted in the recess 3b, the third block 4c is fitted in the recess 3c, and the fourth block 4d is fitted in the recess 3d. Specifically, as shown in FIG. 4, the blocks 4a to 4d are fitted in the recesses 3a to 3d of the connector 3, and the connector 3 is fixed (mounted) on the base 2. The blocks 4a to 4d are fixed respectively at positions of the recesses 3a to 3d defined in the connector 3. By using the connector 3, the relative positions of the blocks 4a to 4d with respect to each other can be controlled with high accuracy. The connector 3 is also constituted of LCP resin.

Figure 5:
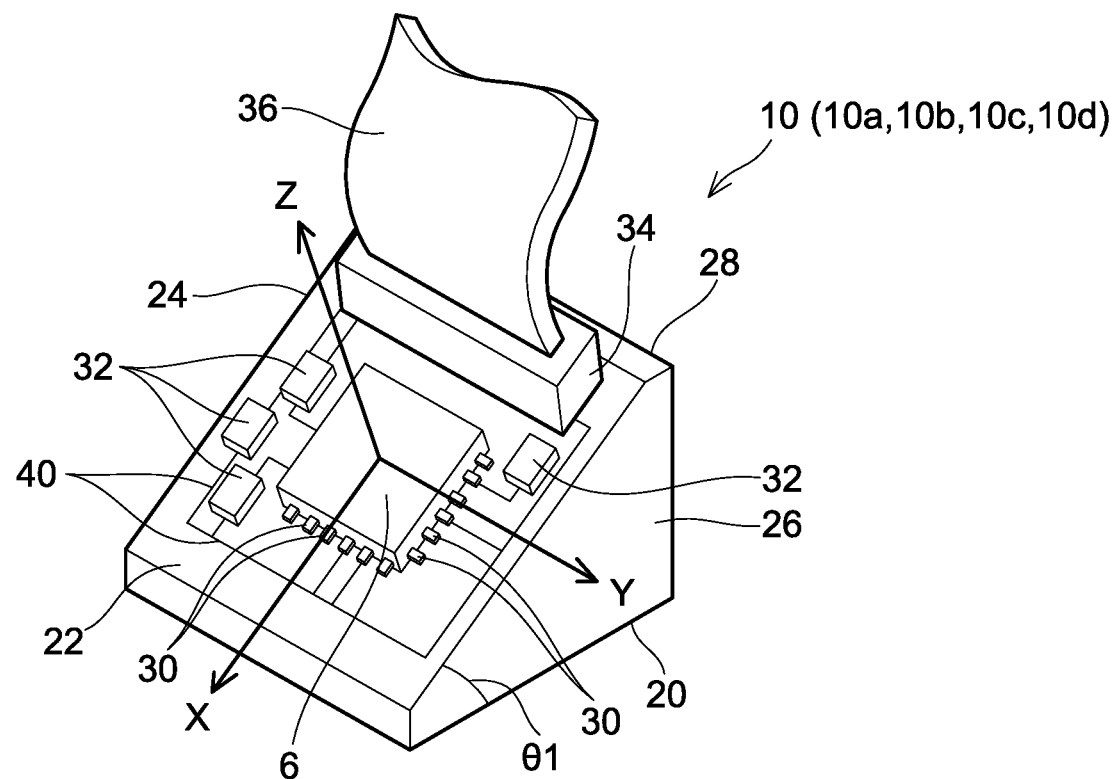
FIG. 5 shows a detailed diagram of the block sensor.

Structure of the block sensor 10 will be described in further detail with reference to FIG. 5. The gyro sensor 6 is fixed to the inclined surface 22 of the block 4 by solder 30. Further, a plurality of electronic components (chip resistance, capacitor, etc.) 32 and a socket 34 in which a Flexible Printed Circuit (FPC) 36 is connected are also fixed by solder (not shown) on the inclined surface 22. The gyro sensor 6 and the electronic components 32 are connected to wirings 40 via solder, and are connected to a circuit arithmetic processing and output module (not shown) provided outside the block sensor 10 via the FPC 36. The wirings 40 are metal thin film formed on the inclined surface 22 using Molded Interconnect Device (MID) technology, and is formed directly on the inclined surface 22 of the block 4 by surface reformation of a LCP resin surface.

The gyro sensor 6 is configured to detect 1-axis angular velocity. Specifically, the gyro sensor 6 is a so-called Z axis gyro sensor that detects angular velocity in a Z direction orthogonal to its mounted plane (inclined surface 22). The gyro sensor 6 has a Quad Flat No-lead package (QFN) structure. Power and GND of the gyro sensor 6 are provided by the aforementioned circuit arithmetic processing and output module. Further, a detection signal of the gyro sensor 6 is outputted to the circuit arithmetic processing and output module.

As the material of the block 4, metal may for example be used instead of the LCP resin. When metal is used as the material of the block 4, the gyro sensor 6, the electronic components 32, and the socket 34 are mounted on a print circuit board on which a wiring pattern is formed, and this print circuit board is mounted on the block 4.

As aforementioned, the inertial force sensor 60 is configured to detect 3-axis angular velocity, namely about the x axis, the y axis, and the z axis. Hereinbelow, measurement principle of the inertial force sensor 60 detecting the 3-axis angular velocity will be described.

Figure 6A:
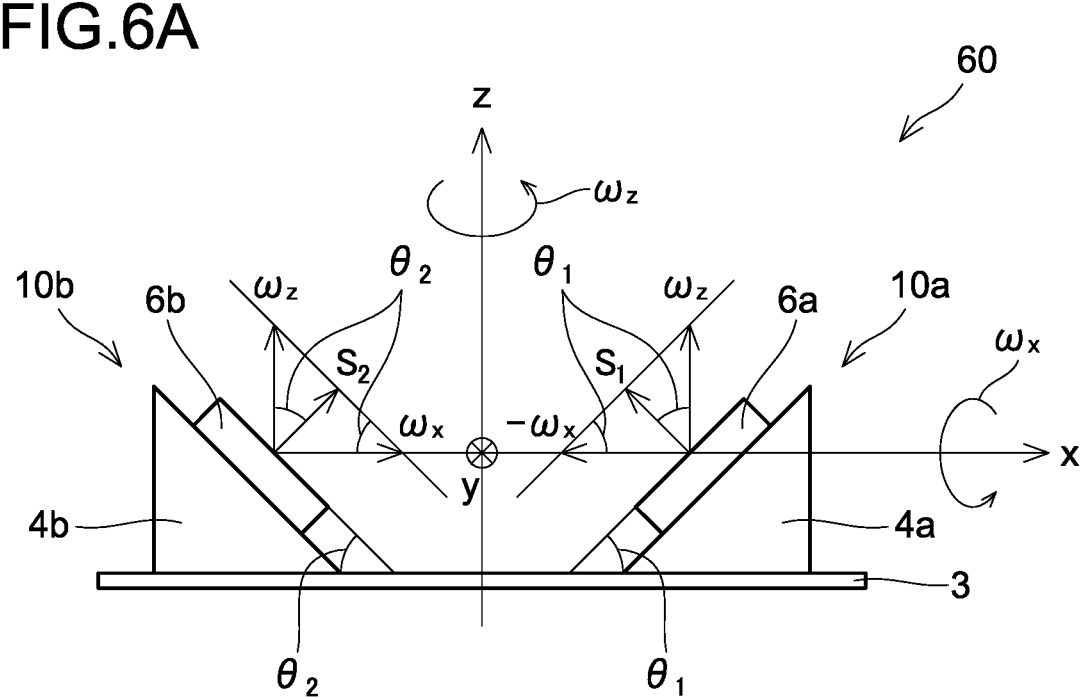
FIGS. 6A and 6B show diagrams for explaining measurement principle of 3-axis angular velocity.
Figure 6B:
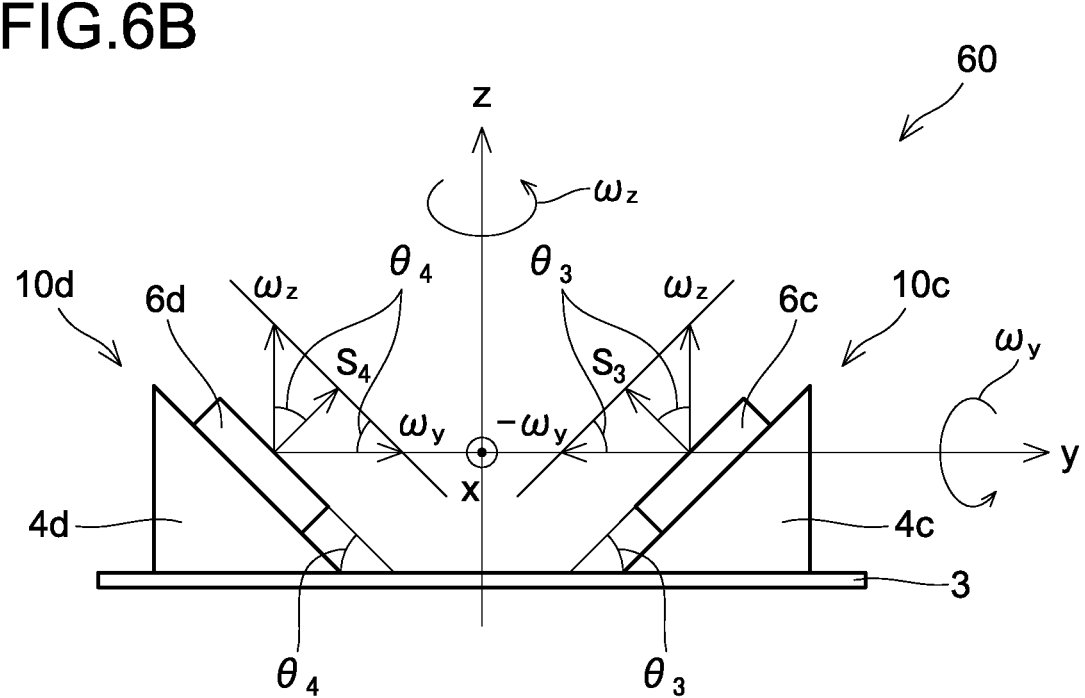

FIG. 6A schematically shows two block sensors (block sensors 10a, 10b) arranged along the x axis direction and FIG. 6B schematically shows two block sensors (block sensors 10c, 10d) arranged along the y axis direction. An angle between the connector 3 and the first gyro sensor 6a is indicated as θ1, an angle between the connector 3 and the second gyro sensor 6b is indicated as θ2, an angle between the connector 3 and the third gyro sensor 6c is indicated as θ3, and an angle between the connector 3 and the fourth gyro sensor 6d is indicated as θ4.

For example, when angular velocity "$\omega_x$" about the x axis is applied to the inertial force sensor 60, "$-\omega_x$" is applied to the first gyro sensor 6a and "$\omega_x$" is applied to the second gyro sensor 6b (FIG. 6A). Further, in this case, "$\omega_x$" is not applied to the third gyro sensor 6c and the fourth gyro sensor 6d. Since the third block 4c and the fourth block 4d are arranged along the y axis direction, they do not detect the angular velocity about the x axis, which is different from their axis.

Further, when angular velocity "$\omega_y$" about the y axis is applied to the inertial force sensor 60, "$-\omega_y$" is applied to the third gyro sensor 6c and "$\omega_y$" is applied to the fourth gyro sensor 6d (FIG. 6B). Further, in this case, "$\omega_y$" is not applied to the first gyro sensor 6a and the second gyro sensor 6b. Since the first block 4a and the second block 4b are arranged along the x axis direction, they do not detect the angular velocity about the y axis, which is different from their axis.

When angular velocity "$\omega_z$" about the z axis is applied to the inertial force sensor 60, "$\omega_z$" is applied to all of the gyro sensors 6a to 6d. That is, all of the gyro sensors 6a to 6d can detect the angular velocity "$\omega_z$" about the z axis. The gyro sensors 6a to 6d are gyro sensors (Z axis gyro sensors) configured to detect angular velocity about the Z direction ($S_1$, $S_2$, $S_3$, $S_4$ directions of FIGS. 6A and 6B) that is orthogonal to their surfaces, as shown in FIG. 5. That is, a main axis (detection axis) of the first gyro sensor 6a is in the $S_1$ direction, a main axis of the second gyro sensor 6b is in the $S_2$ direction, a main axis of the third gyro sensor 6c is in the $S_3$ direction, and a main axis of the fourth gyro sensor 6d is in the $S_4$ direction.

When angular velocity "$\omega_x$", "$\omega_y$", and "$\omega_z$" are applied to the inertial force sensor 60, the angular velocity must be applied along the main axes of the respective gyro sensors 6a to 6d. Due to this, when output signals of the gyro sensors 6a to 6d are assumed as $S_1$, $S_2$, $S_3$, $S_4$, the respective output signals can be expressed by the following formula (1). Further, when the following formula (1) is represented in a matrix equation, it can be expressed by the following formula (2). The inertial force sensor 60 is configured to detect the 3-axis angular velocity based on the following formula (1) or (2).

$$S_1 = \omega_z \cdot \cos\theta_1 - \omega_x {}^* \sin\theta_1$$

$$S_2 = \omega_z \cdot \cos\theta_2 - \omega_x {}^* \sin\theta_2$$

$$S_3 = \omega_z {}^* \cos\theta_3 - \omega_y \cdot \sin\theta_3$$

$$S_4 = \omega_z \cdot \cos\theta_4 - \omega_y {}^* \sin\theta_4 \qquad \text{Formula 1}$$

$$\begin{bmatrix} \omega_x \\ \omega_y \\ \omega_z \\ 0 \end{bmatrix} = \begin{bmatrix} 0.5 & 0 & 0 & 0 \\ 0 & 0.5 & 0 & 0 \\ 0 & 0 & 0.25 & 0 \\ 0 & 0 & 0 & 0 \end{bmatrix} \begin{bmatrix} \dfrac{-1}{\sin\theta_1} & \dfrac{1}{\sin\theta_2} & 0 & 0 \\ 0 & 0 & \dfrac{-1}{\sin\theta_3} & \dfrac{1}{\sin\theta_4} \\ \dfrac{1}{\cos\theta_1} & \dfrac{1}{\cos\theta_2} & \dfrac{1}{\cos\theta_3} & \dfrac{1}{\cos\theta_4} \\ 0 & 0 & 0 & 0 \end{bmatrix} \begin{bmatrix} S_1 \\ S_2 \\ S_3 \\ S_4 \end{bmatrix}$$

Formula 2

Since the inertial force sensor 60 can control the relative positions of the blocks 4a to 4d with high precision by using the connector 3, thus the 3-axis angular velocity can be detected with high accuracy based on the aforementioned formulas (1) and (2).

Figure 7:
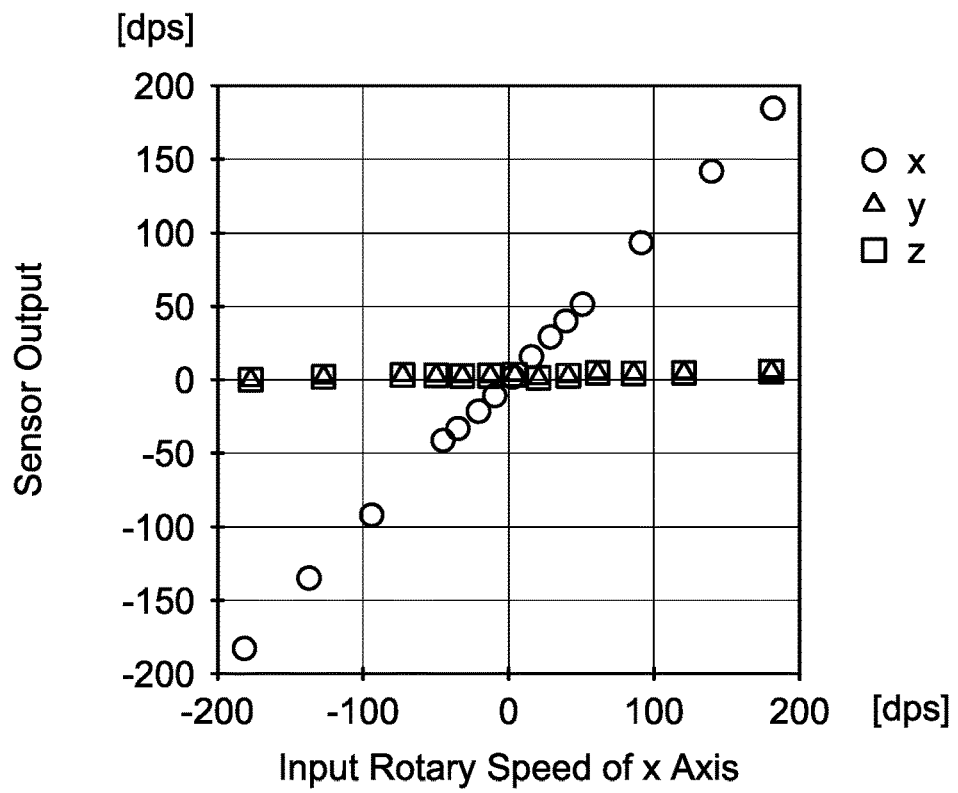
FIG. 7 shows a detected 3-axis angular velocity characteristic of the inertial force sensor.
Figure 8:
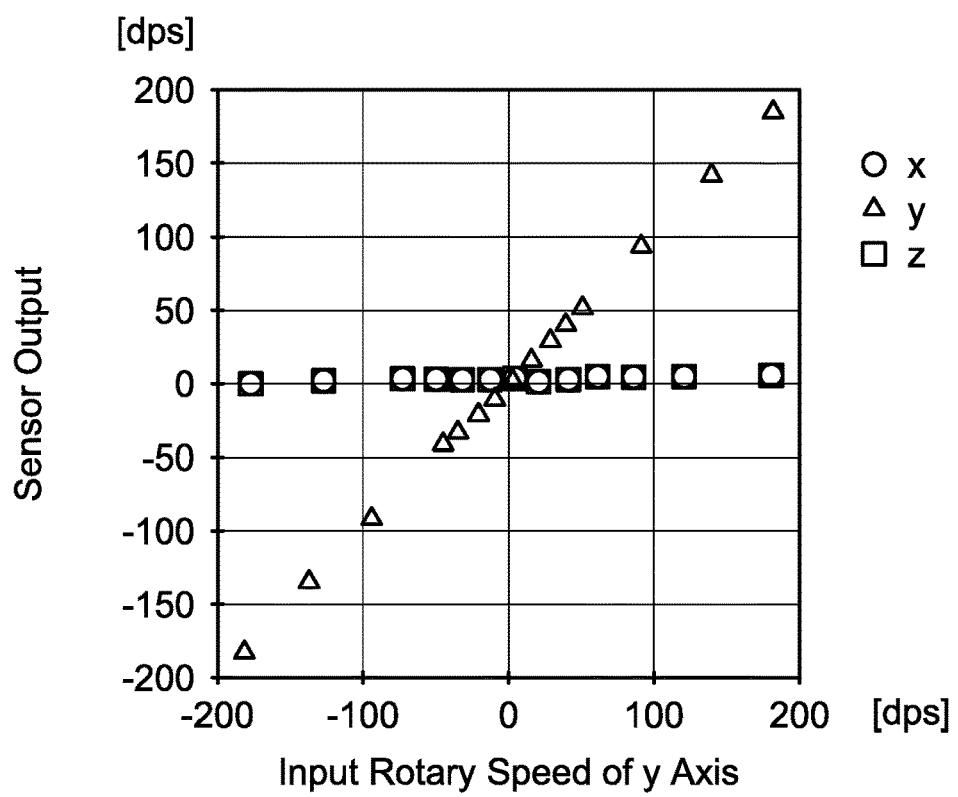
FIG. 8 shows a detected 3-axis angular velocity characteristic of the inertial force sensor.
Figure 9:
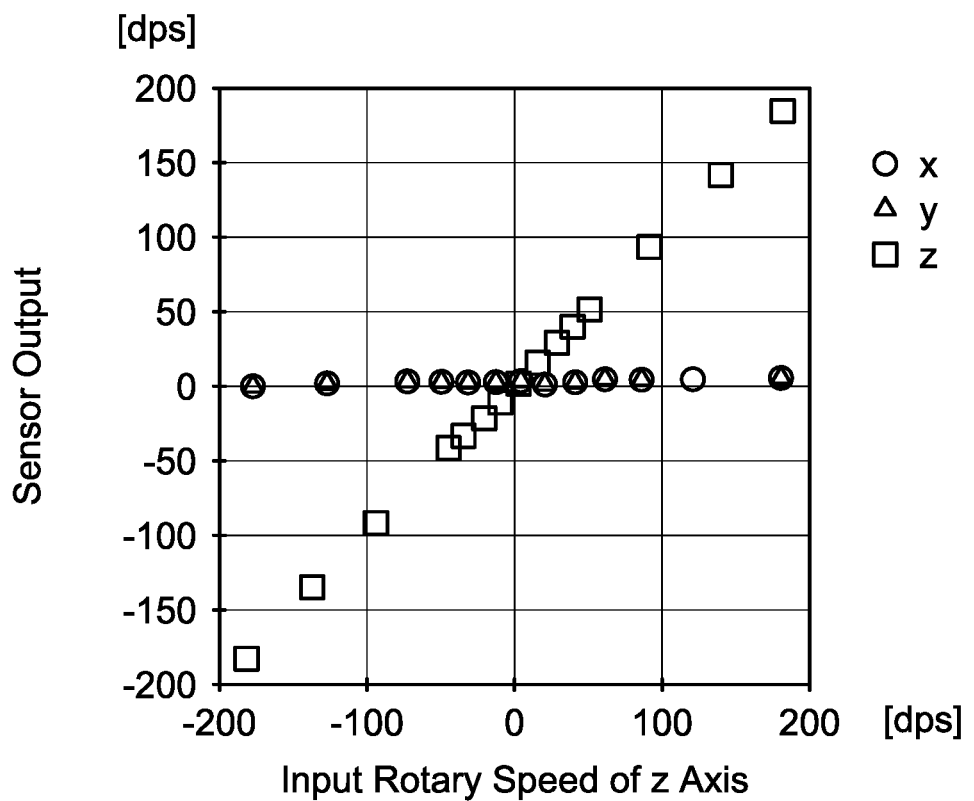
FIG. 9 shows a detected 3-axis angular velocity characteristic of the inertial force sensor.

Next, 3-axis angular velocity characteristics detected by the inertial force sensor 60 will be described with reference to FIGS. 7 to 9. FIG. 7 shows detected values of the angular velocity along each axis (x axis, y axis, z axis) obtained when the inertial force sensor 60 is rotated about the x axis (see FIG. 1 as well). FIG. 8 shows detected values of the angular velocity along each axis (x axis, y axis, z axis) obtained when the inertial force sensor 60 is rotated about the y axis. FIG. 9 shows detected values of the angular velocity along each axis (x axis, y axis, z axis) obtained when the inertial force sensor 60 is rotated about the z axis. In each drawing, a horizontal axis indicates the input about its corresponding axis at an input rotary speed and a vertical axis indicates a sensor output. Further, the x axis angular velocity is indicated by "○", the y axis angular velocity is indicated by "△", and the z axis angular velocity is indicated by "□". As shown in FIGS. 7 to 9, the inertial force sensor 60 can detect the angular velocity along the main axis substantially linearly in accordance with the rotary speed, and the value detected for other axes were substantially "zero". This result indicates that the inertial force sensor 60 is capable of detecting the 3-axis angular velocity with high accuracy.

Next, an internal configuration of the inertial force sensor 60 will be described with reference to FIG. 10. The inertial force sensor 60 comprises a sensing module 50, a circuit arithmetic processing and output module 52, and a temperature sensor module 54. The sensing module 50 is a mount structure such as the block sensors 10. The circuit arithmetic processing and output module 52 is configured to process sensor outputs inputted from the sensing module 50 and output sensor signals to external units. The temperature sensor module 54 is configured to monitor a temperature of the inertial force sensor 60. The circuit arithmetic processing and output module 52 has six functions, namely (1) sensor output acquisition, (2) triaxial processing algorithm, (3) inter-axis orthogonality correcting algorithm, (4) sensitivity correcting algorithm, (5) temperature characteristic correcting algorithm, and (6) triaxial output processing algorithm.

The triaxial processing algorithm detects the 3-axis angular velocity using the aforementioned Formula (1) or (2). The inter-axis orthogonality correcting algorithm has a function of correcting a mounting error of a block sensor with respect to its fixing unit and correcting inter-axis orthogonality to a predetermined value or less. The sensitivity correcting algorithm has a function of correcting decrease in sensor sensitivity that occurs by the correction performed by the inter-axis orthogonality correcting algorithm. The temperature characteristic correcting algorithm has a function of correcting sensitivity in accordance with the temperature based on a measurement result from the temperature sensor module 54. The triaxial output processing algorithm has a function of outputting the 3-axis angular velocity obtained by processing executed by the respective algorithms as sensor signals to external units. Further, the circuit arithmetic processing and output module 52 is configured to supply an output from a DC power source 56 outside the inertial force sensor 60 to the sensing module 50 and the temperature sensor module 54. Further, the circuit arithmetic processing and output module 52 is configured to receive the measurement result of the angular velocity from the sensing module 50 and receive the temperature measurement result from the temperature sensor module 54 by SPI communication.

In the inertial force sensor 60, the Z axis gyro sensors are used as the single-axis inertial force sensors, however, the relative positions of the respective sensors can be adjusted with high accuracy even in cases where Z axis acceleration sensors (G sensors), X axis gyro sensors, or X axis acceleration sensors are used instead of the Z axis gyro sensors, and an inertial force sensor with improved detection accuracy can be obtained in any of such cases. Further, an inertial force sensor with improved detection accuracy can be obtained also in a case of using 2-axis inertial force sensors (such as Z axis gyro sensors and Z axis acceleration sensor, X axis gyro sensors and Z axis gyro sensors, X axis acceleration sensors and Z axis acceleration sensors) are used instead of the single-axis inertial force sensors.

Second Embodiment

An inertial force sensor 160 will be described with reference to FIGS. 11 to 14. The inertial force sensor 160 is a variant of the inertial force sensor 60, and shapes of a connector 103 and blocks 104a to 104d are different from the shapes of the connector 3 and the blocks 4a to 4d of the inertial force sensor 60. In the below description, structures of the inertial force sensor 160 that are substantially same as those of the inertial force sensor 60 will be given the same reference signs given to the inertial force sensor 60, and explanation thereof may be omitted.

A first block sensor 110a includes a first block 104a and a first gyro sensor 6a. A second block sensor 110b includes a second block 104b and a second gyro sensor 6b. A third block sensor 110c includes a third block 104c and a third gyro sensor 6c. A fourth block sensor 110d includes a fourth block 104d and a fourth gyro sensor 6d. The block sensors 110a to 110d are fixed to a connector 103, and the connector 103 is fixed to the surface of the base 2. The blocks 104a to 104d are constituted of a same material, and the block sensors 110a to 110d have substantially same structure as each other.

The first block sensor 110a and the second block sensor 110b are arranged along the x axis direction, and the third block sensor 110c and the fourth block sensor 110d are arranged along the y axis direction. That is, the first block 104a and the second block 104b are arranged along the x axis direction with inclined surfaces 22 of the first block 104a and the second block 104b (see FIGS. 12A to 12F) both facing inward, and the third block 104c and the fourth block 104d are arranged along the y axis direction with inclined surfaces 22 of the third block 104c and the fourth block 104d both facing inward.

Figure 12A:
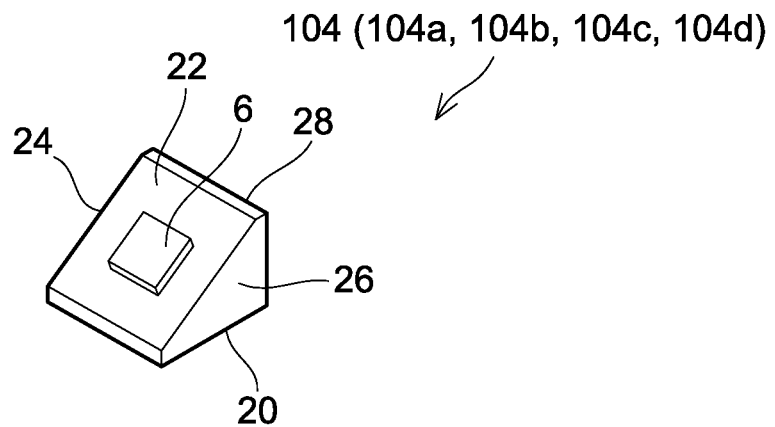
Figure 12B:
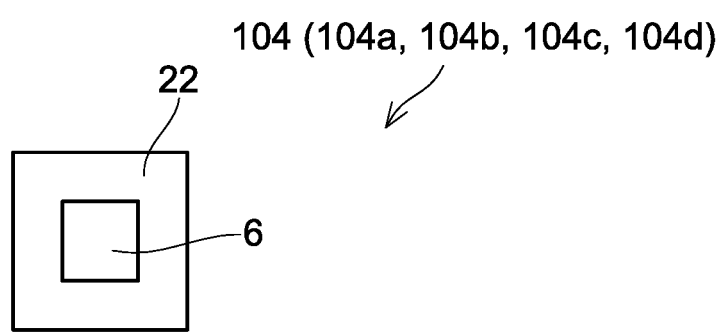
Figure 12C:
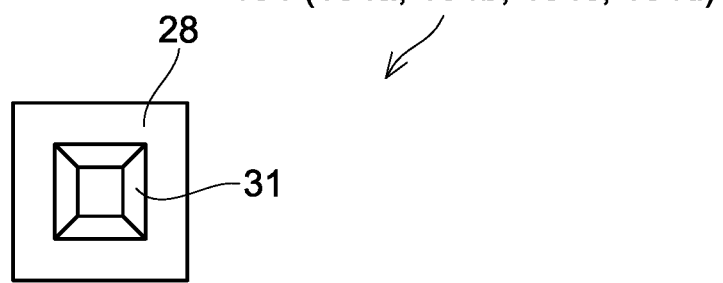
Figure 12D:
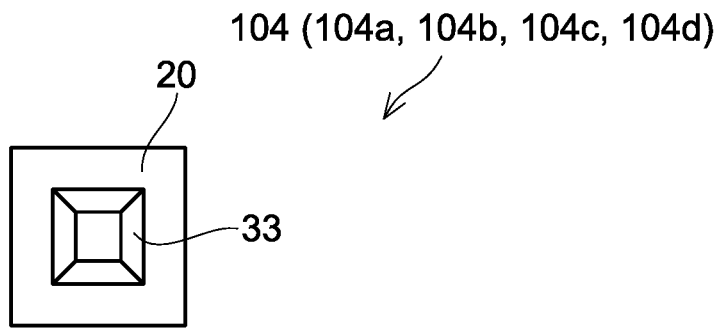
Figure 12E:
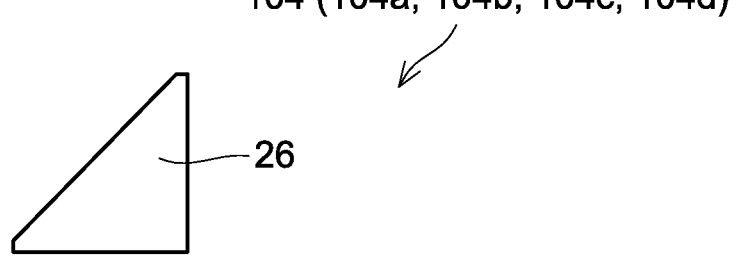
Figure 12F:

FIG. 12A shows a perspective view, FIG. 12B shows a front view, FIG. 12C shows a rear view, FIG. 12D shows a bottom view, FIG. 12E shows a right side view, and FIG. 12F shows a left side view of a block 104. A bottom surface 20, an inclined surface 22, and a rear surface 28 of the block 104 each have a square shape, and a right side surface 26 and a left side surface 24 each have a triangular shape. Further, a recess 31 is defined in the rear surface 28, and a recess 33 is defined in the bottom surface 20. The recess 33 is configured to fit with one of projections 103a to 103d of the connector 103 to be described later. The block 104 is constituted of LCP resin.

FIG. 13 shows a perspective view of the connector 103. Four projections 103a to 103d are arranged on a surface 103s of the connector 103. The projections 103a to 103d have substantially same shape and size as the recesses 33 of the blocks 104a to 104d. The projection 103a fits in the recess 33 of the first block 104a, the projection 103b fits in the recess 33 of the second block 104b, the projection 103c fits in the recess 33 of the third block 104c, and the projection 103d fits in the recess 33 of the fourth block 104d.

As shown in FIG. 14, in the inertial force sensor 160, the blocks 104a to 104d are fitted with the projections 103a to 103d of the connector 103, and the connector 103 is then fixed (mounted) on the base 2. When the blocks 104a to 104d are fitted with the projections 103a to 103d, the bottom surfaces 20 of the blocks 104a to 104d come into surface contact with the surface 103s of the connector 103. The blocks 104a to 104d are fixed to positions of the projections 103a to 103d arranged on the connector 103. By using the connector 103, relative positions of the blocks 104a to 104d with respect to each other can be controlled with high accuracy. The connector 103 is also configured of LCP resin.

Third Embodiment

An inertial force sensor 260 will be described with reference to FIGS. 5 to 17. The inertial force sensor 260 is a variant of the inertial force sensor 160, and a shape of blocks 204a to 204d are different from the shape of the blocks 4a to 4d of the inertial force sensor 160. In the below description, structures of the inertial force sensor 260 that are substantially same as those of the inertial force sensor 160 will be given the same reference signs given to the inertial force sensor 160, and explanation thereof may be omitted.

A first block sensor 210a includes a first block 204a and the first gyro sensor 6a. A second block sensor 210b includes a second block 104b and the second gyro sensor 6b. A third block sensor 210c includes a third block 204c and he third gyro sensor 6c. A fourth block sensor 210d includes a fourth block 204d and the fourth gyro sensor 6d. The block sensors 210a to 210d are fixed to the connector 103, and the connector 103 is fixed to the surface of the base 2. The blocks 204a to 204d are constituted of a same material, and the block sensors 210a to 210d have substantially same structure as each other.

The first block sensor 210a and the second block sensor 210b are arranged along the x axis direction, and the third block sensor 210c and the fourth block sensor 210d are arranged along the y axis direction. That is, the first block 204a and the second block 204b are arranged along the x axis direction with inclined surfaces 22 of the first block 204a and the second block 204b (see FIGS. 16A to 16F) both facing inward, and the third block 204c and the fourth block 204d are arranged along the y axis direction with inclined surfaces 22 of the third block 204c and the fourth block 204d both facing inward.

Figure 16A:
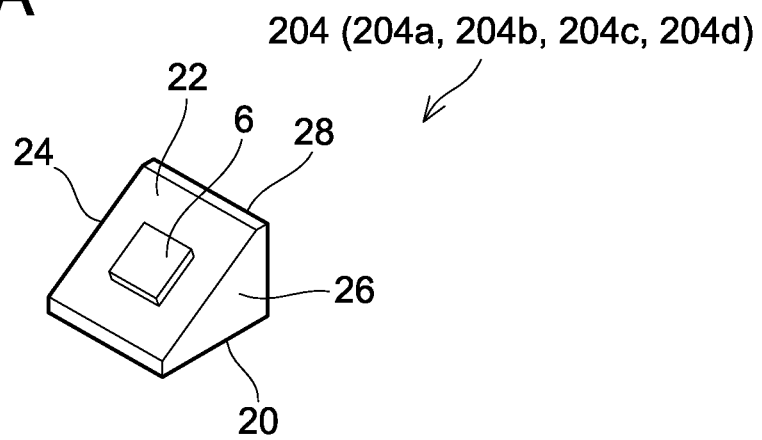
Figure 16B:
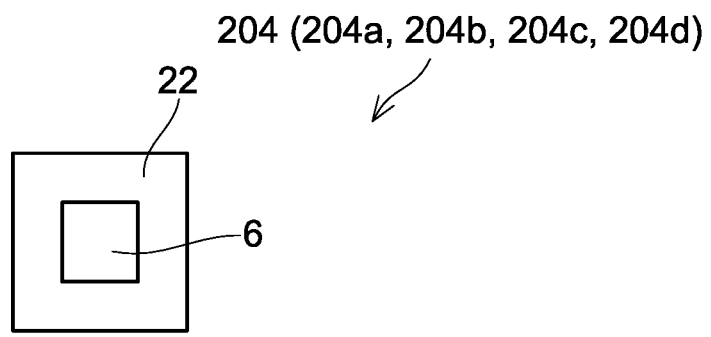
Figure 16C:
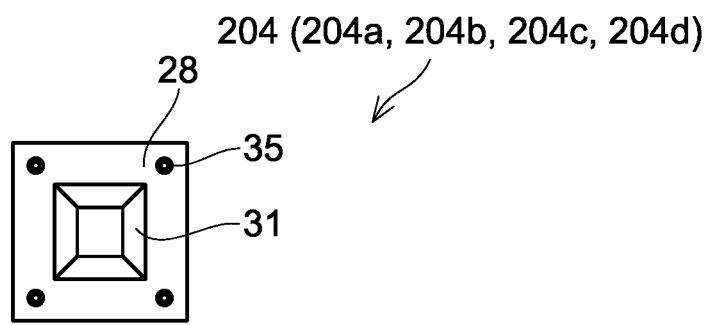
Figure 16D:
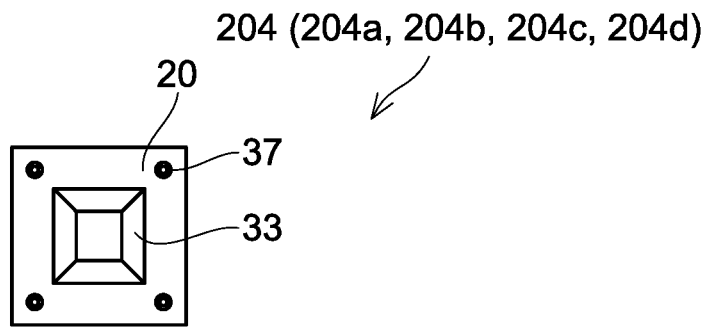
Figure 16E:
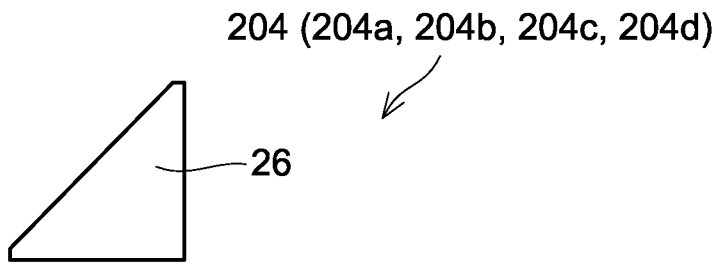
Figure 16F:
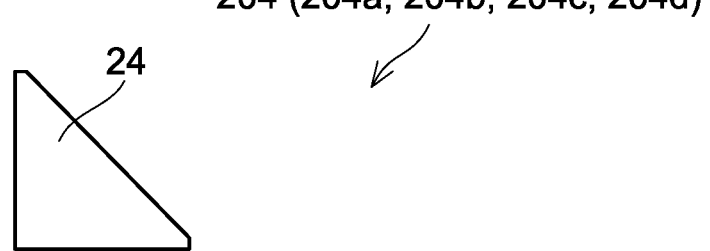

FIG. 16A shows a perspective view, FIG. 16B shows a front view, FIG. 16C shows a rear view, FIG. 16D shows a bottom view, FIG. 16E shows a right side view, and FIG. 16F shows a left side view of a block 204. A bottom surface 20, an inclined surface 22, and a rear surface 28 of the block 204 each have a square shape, and a right side surface 26 and a left side surface 24 each have a triangular shape. Further in the block 204, a recess 31 is defined in the rear surface 28, and four reference projections 35 are arranged around the recess 31. See recesses 31a and 31d in blocks 104a and 104d, respectively, in FIG. 11; recesses 31a and 31d in blocks 204a and 204d, respectively, in FIG. 15; and reference projection 35a in blocks 204a and 204d in FIG. 15. The reference projections 35 are arranged at four corners of the rear surface 28. Further, a recess 33 is defined in the bottom surface 20, and four reference projections 37 are arranged around the recess 33. The reference projections 37 are arranged at four corners of the bottom surface 20. Although this will be described later, the recess 33 is configured to fit with one of the projections 103a to 103d of the connector 103 (see FIG. 13). The block 304 is constituted of LCP resin.

As shown in FIG. 17, in the inertial force sensor 260, the blocks 204a to 204d are fitted with the projections 103a to 103d of the connector 103, and the connector 103 is then fixed (mounted) on the base 2. When the blocks 204a to 204d are fitted with the projections 103a to 103d, the reference projections 37 of the blocks 204a to 204d come into surface contact with the surface 103s of the connector 103. In other words, the bottom surfaces 20 of the blocks 204a to 204d do not come into contact with the surface 103s of the connector 103 by their portions other than the reference projections 37. By providing the reference projections 37 on the blocks 204a to 204d, contacting areas between the surface 103s of the connector 103 and the blocks 204a to 204d can be reduced significantly. As a result, even when warping occurs in the surface 103s of the connector 103 or the bottom surfaces 20 of the blocks 204a to 204d, for example, such warping is less likely to impose adverse influence on the inertial force sensor. By having the reference projections 37 and the connector 103 contact each other, the inertial force sensor 260 can control positioning of the blocks 204a to 204d with respect to the connector 103 with high accuracy.

Fourth Embodiment

An inertial force sensor 360 will be described with reference to FIGS. 18 to 20. The inertial force sensor 360 is a variant of the inertial force sensor 160, and a shape of a connector 303 and arranged directions of the block sensors 110a to 110d are different from those of the inertial force sensor 160. In the below description, structures of the inertial force sensor 360 that are substantially same as those of the inertial force sensor 160 will be given the same reference signs given to the inertial force sensor 160, and explanation thereof may be omitted.

In the inertial force sensor 360, the first block sensor 110a and the second block sensor 110b are arranged along the x axis direction with their inclined surfaces 22 (see FIGS. 12A to 12F) both facing outward. Further, the third block sensor 110c and the fourth block sensor 110d are arranged along the y axis direction with their inclined surfaces 22 both facing outward. That is, the first block 104a and the second block 104b are arranged along the x axis direction with the inclined surfaces 22 of the first block 104a and the second block 104b (see FIGS. 12A to 12F) both facing outward, and the third block 104c and the fourth block 104d are arranged along the y axis direction with the inclined surfaces 22 of the first block 104a and the second block 104b both facing outward. The block sensors 110a to 110d are fixed to the connector 303. Further, the block sensors 110a to 110d and the connector 303 are fixed to the surface of the base 2.

FIG. 19 shows a perspective view of the connector 303. The connector 303 has a cuboid shape, and each of side surfaces 39a, 39b, 39c, and 39d has corresponding one of projections 303a, 303b, 303c, and 303d arranged thereon. A shape of the projections 303a to 303d is substantially the same as the shape and size of the recesses 31 defined in the rear surfaces 28 of the blocks 104a to 104d. The projection 303a is configured to fit with the recess 31 of the first block 104a, the projection 303b is configured to fit with the recess 31 of the second block 104b, the projection 303c is configured to fit with the recess 31 of the third block 104c, and the projection 303d is configured to fit with the recess 31 of the fourth block 104d.

As shown in FIG. 20, in the inertial force sensor 360, the blocks 104a to 104d are fitted with the projections 303a to 303d of the connector 303. When the blocks 104a to 104d are fitted with the projections 303a to 303d, the rear surface 28 of the first block 104a comes into surface contact with the side surface 39a of the connector 303, the rear surface 28 of the second block 104b comes into surface contact with the side surface 39b of the connector 303, the rear surface 28 of the third block 104c comes into surface contact with the side surface 39c of the connector 303, and the rear surface 28 of the fourth block 104d comes into surface contact with the side surface 39d of the connector 303. The blocks 104a to 104d are fixed to positions of the projections 303a to 303d arranged on the connector 303. By using the connector 303, the relative positions of the blocks 104a to 104d with respect to each other can be controlled with high accuracy. The connector 303 is also configured of LCP resin.

Fifth Embodiment

An inertial force sensor 460 will be described with reference to FIGS. 21 and 22. The inertial force sensor 460 is a variant of the inertial force sensor 360, and uses the block sensors 210a to 210d instead of the block sensors 110a to 110d. In the below description, structures of the inertial force sensor 460 that are substantially same as those of the inertial force sensor 360 will be given the same reference signs given to the inertial force sensor 360, and explanation thereof may be omitted.

In the inertial force sensor 460, the first block sensor 210a and the second block sensor 210b are arranged along the x axis direction with their inclined surfaces 22 (see FIGS. 16A to 16F) both facing outward. Further, the third block sensor 210c and the fourth block sensor 210d are arranged along the y axis direction with their inclined surfaces 22 both facing outward. The block sensors 210a to 210d are fixed to the connector 303. Further, the block sensors 210a to 210d and the connector 303 are fixed to the surface of the base 2.

As shown in FIG. 22, in the inertial force sensor 460, the blocks 204a to 204d are fitted with the projections 303a to 303d of the connector 303. When the blocks 204a to 204d are fitted with the projections 303a to 303d, the reference projections 35 of the blocks 204a to 204d come into surface contact with the side surfaces 39a to 39d of the connector 303. In other words, portions of the rear surfaces 28 of the block 204a to 204d other than the reference projections 35 do not come into contact with the side surfaces 303a to 303d of the connector 303. After the block sensors 210a to 210d are fixed to the connector 303, the block sensors 210a to 210d and the connector 303 are fixed to the surface of the base 2. The reference projections 37 are arranged on the bottom surfaces 20 of the blocks 204a to 204d (see FIG. 16D). Due to this, the reference projections 37 of the blocks 204a to 204d come into surface contact with the base 2 and portions of the blocks 204a to 204d other than the reference projections 37 do not contact t the base 2. With the inertial force sensor 460, contacting areas between the blocks 204a to 204d and the connector 303 as well as contacting areas between the blocks 204a to 204d and the base 2 can be reduced significantly. As a result, even when warping occurs in the side surfaces 39a to 39d of the connector 303, the surface of the base 2, or the blocks 204a to 204d, such warping is less likely to impose adverse influence on the inertial force sensor. The inertial force sensor 460 can control the positioning of the blocks 204a to 204d with respect to the connector 103 and the positioning of the blocks 204a to 204d with respect to the base 2 with high accuracy.

Sixth Embodiment

An inertial force sensor 560 will be described with reference to FIGS. 23 to 26. The inertial force sensor 560 is a variant of the inertial force sensor 460, and shapes of a connector 503 and blocks 504a to 504d are different from the shapes of the connector 303 and the blocks 204a to 204d of the inertial force sensor 460. In the below description, structures of the inertial force sensor 560 that are substantially same as those of the inertial force sensor 460 will be given the same reference signs given to the inertial force sensor 460, and explanation thereof may be omitted.

As shown in FIG. 23, a first block sensor 510a includes a first block 504a and the first gyro sensor 6a. A second block sensor 510b includes a second block 504b and the second gyro sensor 6b. A third block sensor 510c includes a third block 504c and the third gyro sensor 6c. A fourth block sensor 510d includes a fourth block 504d and the fourth gyro sensor 6d. Although details will be given later, the inertial force sensor 560 has the block sensor 510c and the block sensor 510d fixed by the connector 503. Further, the block sensors 510a to 510d contact each other, by which their relative positions with respect to each other are defined. The blocks 504a to 504d are constituted of a same material, and the block sensors 510a to 510d have substantially same structure as each other. The first block sensor 510a and the second block sensor 510b are arranged along the x axis direction with their inclined surfaces 22 (see FIGS. 24A to 24F) both facing outward. Further, the third block sensor 510c and the fourth block sensor 510d are arranged along the y axis direction with their inclined surfaces 22 both facing outward.

Figure 24A:
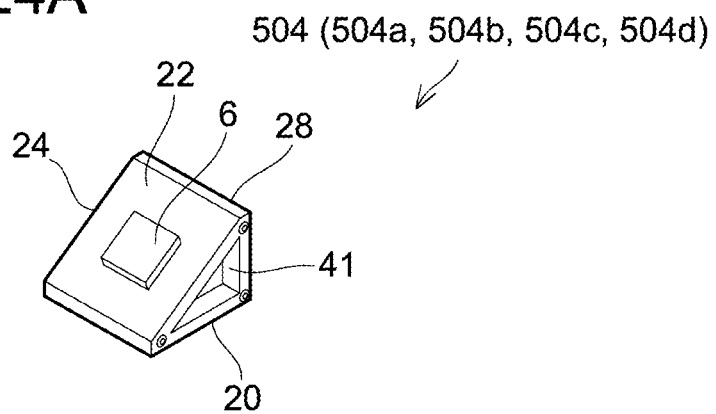
Figure 24B:
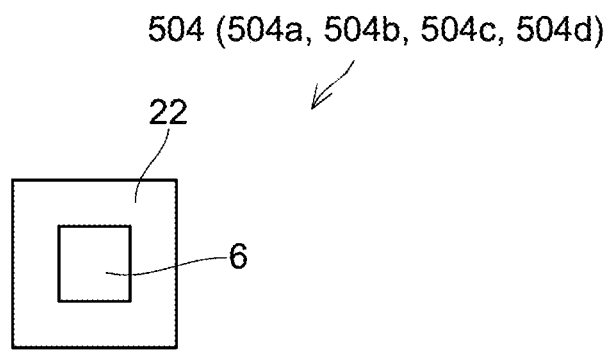
Figure 24C:
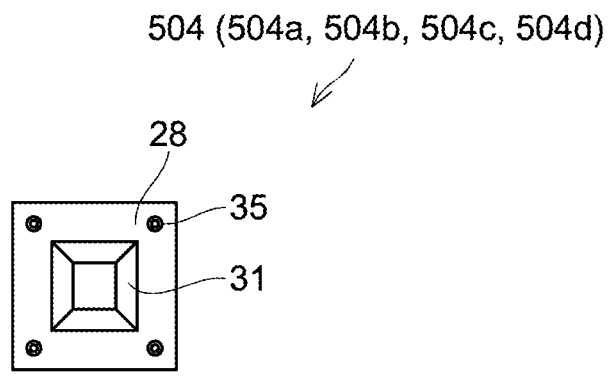
Figure 24D:
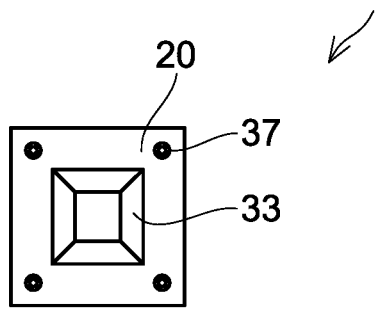
Figure 24E:
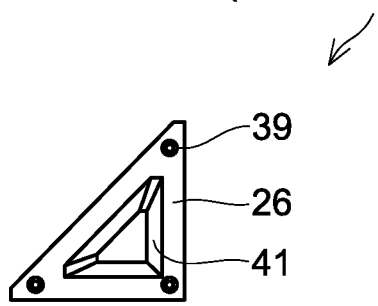
Figure 24F:
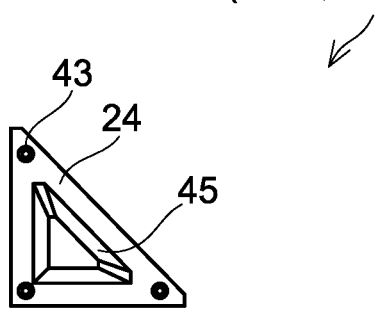

FIG. 24A shows a perspective view, FIG. 24B shows a front view, FIG. 24C shows a rear view, FIG. 24D shows a bottom view, FIG. 24E shows a right side view, and FIG. 24F shows a left side view of a block 504. A bottom surface 20, an inclined surface 22, and a rear surface 28 of the block 504 each have a square shape, and a right side surface 26 and a left side surface 24 each have a triangular shape. Further in the block 504, a recess 31 is defined in the rear surface 28, and four reference projections 35 are arranged around the recess 31. The reference projections 35 are arranged at four corners of the rear surface 28. Further, a recess 33 is defined in the bottom surface 20, and four reference projections 37 are arranged around the recess 33. The reference projections 37 are arranged at four corners of the bottom surface 20. A recess 41 is defined in the right side surface 26, and three reference projections 39 are arranged around the recess 41. The reference projections 39 are arranged at vertices of the right side surface 26. A recess 45 is defined in the left side surface 24, and three reference projections 43 are arranged around the recess 45. The reference projections 43 are arranged at vertices of the left side surface 24. The block 504 is constituted of LCP resin.

As shown in FIG. 25, in the inertial force sensor 560, firstly the third block sensor 510c and the fourth block sensor 510d are fixed using the connector 503. The connector 503 has a shape that is to fit with the recess 31 defined in the rear surface 28 of the block 504c and the recess 31 defined in the rear surface 28 of the block 504d (although this recess is not visible in FIG. 25). Due to this, by fitting the connector 503 into the recess 31 of the block sensor 510c and the recess 31 of the block sensor 510d, the third block sensor 510c and the fourth block sensor 510d are fixed. When the block sensor 510c and the block sensor 510d are fixed, the connector 503 is not interposed between a flat portion of the rear surface 28 of the block sensor 510c and a flat portion of the rear surface 28 of the block sensor 510d. Due to this, the rear surface 28 of the block sensor 510c and the rear surface 28 of the block sensor 510d do not contact the connector 503 at their portions other than the recesses 31. Although details will be described later, relative positions of the block sensor 510c and the block sensor 510d are defined by the reference projections 35 on the rear surface 28 of the block sensor 510c and the reference projections 35 on the rear surface 28 of the block sensor 510d coming into surface contact.

Next, as shown in FIG. 26, the first block sensor 510a and the second block sensor 510b are fixed (mounted) with respect to the third block sensor 510c and the fourth block sensor 510d. The reference projections 43 of the third block sensor 510c and the reference projections 39 of the fourth block sensor 510d come into surface contact with the rear surface 28 of the first block sensor 510a. Further, the reference projections 35 arranged on the rear surface 28 of the first block sensor 510a come into surface contact with the right side surface 26 of the third block sensor 510c and the left side surface 24 of the fourth block sensor 510d. Further, the reference projections 35 arranged on the rear surface 28 of the second block sensor 510b (see FIG. 24C) come into surface contact with the left side surface 24 of the third block sensor 510c and the right side surface 26 of the fourth block sensor 510d.

Contact states of the block sensors 510a to 510d will be described in further detail with reference to FIG. 27. FIG. 27 is a cross-sectional view along a line C27-C27 in FIG. 23. As shown in FIG. 27, the third block 504c and the fourth block 504d have their reference projections 35 in surface contact with each other. Due to this, a space is defined between the rear surface 28 of the third block 504c and the rear surface 28 of the fourth block 504d at portions other than the reference projections 35. That is, by bringing the reference projections 35 of the third block 504c and the fourth block 504d into surface contact with each other, a contacting area between the third block 504c and the fourth block 504d can significantly be reduced. Further, as shown by broken lines, the reference projections 35 of the first block 504a are in surface contact with the left side surface 24 of the third block 504c and the right side surface 26 of the fourth block 504d. Due to this, a space is defined between the rear surface 28 of the first block 504a and the left side surface 24 of the third block 504c and the right side surface 26 of the fourth block 504d at portions other than the reference projections 35. As a result, contacting areas between the first block 504a, the third block 504c, and the fourth block 504d can also be reduced significantly. Similarly, contacting areas between the second block 504b, the third block 504c, and the fourth block 504d can be reduced significantly.

Further, the reference projections 37 arranged on the bottom surfaces 20 of the blocks 504a to 504d are in surface contact with the surface of the base 2. Due to this, contacting areas between the bottom surfaces 20 of the blocks 504a to 504d and the surface of the base 2 can also be reduced significantly. The inertial force sensor 560 is capable of reducing the contacting areas between the blocks 504a to 504d as well as the contacting areas between the blocks 504a to 504d and the base 2. As a result, even when warping occurs in the blocks 504a to 504d and/or the base 2, such warping is less likely to impose adverse influence on the inertial force sensor.

Next, surface precision of reference projections arranged on the blocks 504 (504a to 504d) with reference to FIGS. 28 to 30. FIGS. 28 and 29 are diagrams for explaining a measuring portion, and FIG. 30 shows a result of surface precision measurement. FIGS. 28 and 29 indicate the sizes of the reference projections larger than their actual sizes for clearer explanation on the measurement positions.

Firstly, the LCP resin is injection molded, and four blocks 504 were produced. In regard to the right side surface 26 shown in FIG. 28, a length L1 of a common side with the bottom surface 20 was 12 mm, and a length L2 of a common side with the rear surface 28 was 12 mm. The side surfaces of each block 504 are substantially isosceles triangles, and the inclination angle of the inclined surface 22 with respect to the bottom surface 20 was 45 degrees. In the rear surface 28 shown in FIG. 29, a length L3 of a common side with the bottom surface 20 was 14 mm. Further, the reference projections 35, 37, 39, and 43 were all configured as truncated circular cones with the same size, with a distal diameter R1 of 0.5 mm and a height H1 of 0.2 mm. The gyro sensor 6 was welded by solder on the inclined surface 22 of such block 504.

Next, the measuring portion will be described. Firstly, by using the gyro sensor 6 and the reference projections 35, 37, 39, and 43, five virtual planes S1 to S5 were created. The virtual plane S1 is a surface of the gyro sensor 6. The virtual plane S2 is a plane including distal ends of the four reference projections 37 arranged on the bottom surface 20. The virtual plane S3 is a plane including distal ends of the four reference projections 35 arranged on the rear surface 28. The virtual plane S4 is a plane including distal ends of the three reference projections 39 arranged on the right side surface 26. The virtual plane S5 is a plane including distal ends of the three reference projections 43 arranged on the left side surface 24.

The virtual planes S1 to S5 were measured using a 3D coordinate measurement apparatus (PRISMO NAVI 7, Carl Zeiss Co., Ltd.), and dihedral angles between the respective virtual planes S1 to S5 were measured. The result thereof is shown in FIG. 30. As shown in FIG. 30, the averages of the four blocks 504 had less than 0.05 degrees of error from the ideal angles in all of the dihedral angles. From this result, the blocks 504 have been confirmed as having very good dihedral angles. As aforementioned, in the inertial force sensor 560, the reference projections or the reference projections and the blocks 504 are brought into contact to define the relative positions of the blocks 504a to 504d. Since the dihedral angles of the blocks 504 are excellent, it can be understood that positioning accuracy of the block 504a to 504d in the inertial force sensor 560 is excellent.

Seventh Embodiment

An inertial force sensor 660 will be described with reference to FIGS. 31 and 32. The inertial force sensor 660 is a variant of the inertial force sensor 560, and uses a connector 603 instead of the connector 503 to connect the blocks 504a to 504d. In the below description, structures of the inertial force sensor 660 that are substantially same as those of the inertial force sensor 560 will be given the same reference signs given to the inertial force sensor 560, and explanation thereof may be omitted.

As shown in FIG. 32, the connector 603 is configured of a first connector 603a, a second connector 603b, a third connector 603c, and a fourth connector 603d. The connectors 603a to 603d have a substantially L shape. Further, the connectors 603a to 603d all have same shape.

As shown in FIG. 31, each of the connectors 603a to 603d fits with the recess 41 on the right side surface 26 of one of the blocks 504a to 504d and the recess 45 on the left side surface 24 of another one of the blocks 504a to 504d, and thus connects two of the blocks 504a to 504d (see FIG. 24 as well). Specifically, the first connector 603a connects the first block 504a and the third block 504c, the second connector 603b connects the second block 504b and the fourth block 504d, the third connector 603c connects the third block 504c and the second block 504b, and the fourth connector 603d connects the fourth block 504d and the first block 504a. In the inertial force sensor 660, the first block sensor 510a and the second block sensor 510b are arranged along the x axis direction with their inclined surfaces 22 both facing inward. Further, the third block sensor 510c and the fourth block sensor 510d are arranged along the y axis direction with their inclined surfaces 22 both facing inward.

The blocks 504a to 504d have the same shape, and the connectors 603a to 603d have the same shape. Due to this, when the connectors 603a to 603d are fitted into the recesses 41, 45 of the blocks 504a to 504d, distances between the adjacent blocks 504a to 504d are positioned to be equal to each other. Further, since the reference projections 37 are arranged on the bottom surfaces 20 of the blocks 504a to 504d (see FIG. 24 as well), the contacting areas between the bottom surfaces 20 of the blocks 504a to 504d and the surface of the base 2 can significantly be reduced (see FIG. 27 as well). Due to this, the inertial force sensor 660 is robust against the adverse effects caused in the event where warping occurs in the blocks 504a to 504d and/or the base 2.

Eighth Embodiment

An inertial force sensor 760 will be described with reference to FIGS. 33 to 37. As shown in FIG. 33, the inertial force sensor 760 includes the base 2, a connector 703, a first block sensor 710a, a second block sensor 710b, a third block sensor 710c, and a fourth block sensor 710d. The first block sensor 710a includes a first block 704a and the first gyro sensor 6a. The second block sensor 710b includes a second block 704b and the second gyro sensor 6b. The third block sensor 710c includes a third block 704c and the third gyro sensor 6c. The fourth block sensor 710d includes a fourth block 704d and the fourth gyro sensor 6d. The block sensors 710a to 710d are fixed to the connector 703. Further, the connector 703 is fixed to the surface of the base 2. The block 704a to 704d are constituted of a same material, and the block sensor 710a to 710d have substantially same structure as each other.

The first block sensor 710a and the second block sensor 710b are arranged along the x axis direction with their inclined surfaces 22 (see FIGS. 34A to 34F) both facing inward. Further, the third block sensor 710c and the fourth block sensor 710d are arranged along the y axis direction with their inclined surfaces 22 both facing inward.

Figure 34A:
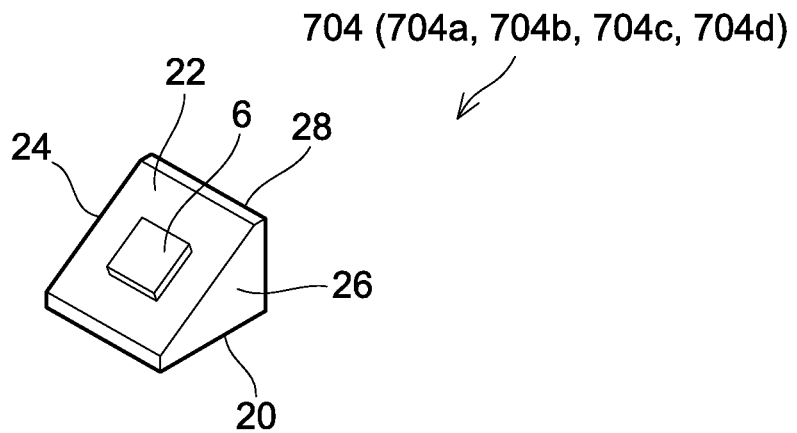
Figure 34B:
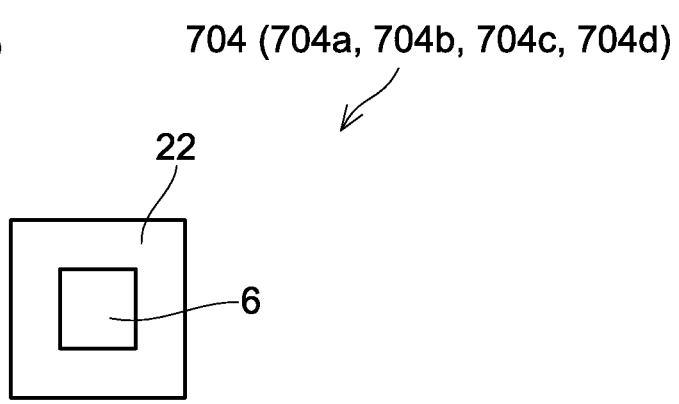
Figure 34C:
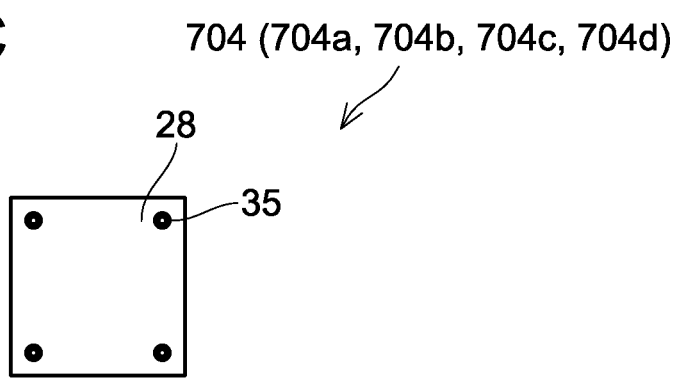
Figure 34D:
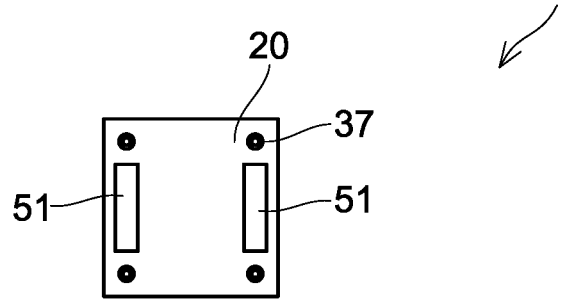
Figure 34E:
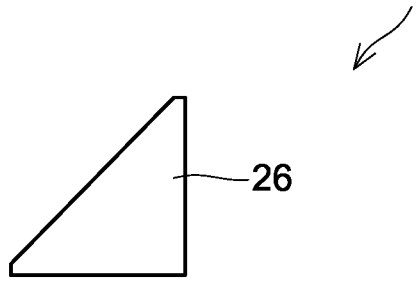
Figure 34F:
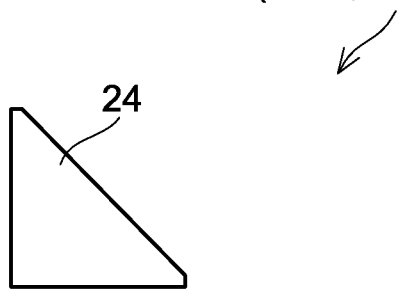

FIG. 34A shows a perspective view, FIG. 34B shows a front view, FIG. 34C shows a rear view, FIG. 34D shows a bottom view, FIG. 34E shows a right side view, and FIG. 34F shows a left side view of a block 704. A bottom surface 20, an inclined surface 22, and a rear surface 28 of the block 704 each have a square shape, and a right side surface 26 and a left side surface 24 each have a triangular shape. Further, in the block 704, four reference projections 35 are arranged on the rear surface 28. The reference projections 35 are arranged at four corners of the rear surface 28. Further, four reference projections 37 are arranged on the bottom surface 20. The reference projections 37 are arranged at four corners of the bottom surface 20. Further, two metal pads 51 are arranged on the bottom surface 20. Specifically, the pads 51 are formed by using the MID technology, and are plated films primarily containing nickel. A thin gold film is formed on an outermost surface of each pad 51. The block 704 is constituted of LCP resin.

FIG. 35 shows a plan view of the connector 703. Metal connection pads 71 that constitute pairs are arranged at eight positions with intervals between each other on a surface of the connector 703. The pads 51 and the connection pads 71 are mechanically bonded by reflow processing using solder. Since the thin gold films are formed on the outermost surfaces of the pads 51, the solder can easily wet the surfaces of the pads 51. Further, positions of the connection pads 71 are positioned with high accuracy such that positions of the block sensors 710a to 710d would be at their designed positions when the block sensors 710a to 710d are fixed to the connector 703. The positions surrounded by broken lines in FIG. 35 are the designed positions for fixing the block sensors 710a to 710d. Through holes 73 are perforated at two of the four corners of the connector 703. The through holes 73 are used for positioning a supporting jig 75 that is used upon fixing the block sensors 710a to 710d to the connector 703.

As shown in FIG. 36, the supporting jig 75 has a frame shape, with a cross-shaped through hole 77 at its center. The through hole 77 is used for positioning the block sensors 710a to 710d upon fixing the block sensors 710a to 710d to the connector 703. Further, through holes 79 are perforated at two of the four corners of the supporting jig 75. The through holes 79 are used for positioning with the connector 703 upon fixing the block sensors 710a to 710d to the connector 703. Specifically, as shown in FIG. 37, fixing pins 81 are inserted into the through holes 79 and 73, and the block sensors 710a to 710d are passed through the through hole 77 in this state where the supporting jig 75 and the connector 703 are positioned. The block sensors 710a to 710d are bonded with the connector 703 by solder in the state of being positioned by the through holes 79. After the soldering, the supporting jig 75 is removed from the connector 703.

Since the reference projections 37 are arranged on the bottom surfaces 20 of the blocks 704a to 704d (see FIG. 34D), the reference projections 37 come into surface contact with the surface of the connector 703, and thus contacting areas between the blocks 704a to 704d and the connector 703 can be reduced significantly. Due to this, for example, even when warping occurs in the blocks 704a to 704d or the connector 703, such warping is less likely to impose adverse influence on the inertial force sensor. In the inertial force sensor 760, the blocks 204a to 204d (see FIGS. 16A to 16F)

or the blocks 504a to 504d (see FIGS. 24A to 24F) may be used instead of the blocks 704a to 704d. That is, to improve molding performance of the blocks, the recesses may be arranged on the rear surfaces 28 and/or the bottom surfaces 20.

The technical elements explained in the present description or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. An inertial force sensor comprising:
   a base;
   a first block mounted on the base and including a bottom surface that is substantially parallel to a surface of the base, a rear surface that is substantially perpendicular to the surface of the base, and an inclined surface that is inclined with respect to the surface of the base and connects the bottom surface and the rear surface;
   a second block mounted on the base and including a bottom surface that is substantially parallel to the surface of the base, a rear surface that is substantially perpendicular to the surface of the base, and an inclined surface that is inclined with respect to the surface of the base and connects the bottom surface and the rear surface;
   a third block mounted on the base and including a bottom surface that is substantially parallel to the surface of the base, a rear surface that is substantially perpendicular to the surface of the base, and an inclined surface that is inclined with respect to the surface of the base and connects the bottom surface and the rear surface;
   a fourth block mounted on the base and including a bottom surface that is substantially parallel to the surface of the base, a rear surface that is substantially perpendicular to the surface of the base, and an inclined surface that is inclined with respect to the surface of the base and connects the bottom surface and the rear surface;
   a first single-axis inertial force sensor arranged on the inclined surface of the first block;
   a second single-axis inertial force sensor arranged on the inclined surface of the second block;
   a third single-axis inertial force sensor arranged on the inclined surface of the third block;
   a fourth single-axis inertial force sensor arranged on the inclined surface of the fourth block;
   a connector configured to physically connect the first, second, third, and fourth blocks; and
   a circuit arithmetic processing and output module configured to execute an arithmetic algorithm that processes an output from each of the single-axis inertial force sensors and an output algorithm that outputs multiple-axis inertial force obtained by the arithmetic algorithm, wherein:
   the first and second blocks are aligned along a first direction parallel to the surface of the base with their inclined surfaces both facing inward toward a center of the surface of the base or both facing outward toward peripherals of the surface of the base, and
   the third and fourth blocks are aligned along a second direction parallel to the surface of the base and orthogonal to the first direction with their inclined surfaces both facing inward toward the center of the surface of the base or both facing outward toward peripherals of the surface of the base.

2. The inertial force sensor according to claim 1, wherein the first, second, third, and fourth blocks are identical in shape.

3. The inertial force sensor according to claim 1, wherein the first, second, third, and fourth blocks are constituted of a same resin material.

4. The inertial force sensor according to claim 1, wherein the connector is constituted of a resin material that is a same material that constitutes the blocks.

5. An inertial force sensor comprising:
   a base;
   a first block mounted on the base and including an inclined surface that is inclined with respect to a surface of the base and a recess defined on a surface of the first block other than the inclined surface;
   a second block mounted on the base and including an inclined surface that is inclined with respect to the surface of the base and a recess defined on a surface of the second block other than the inclined surface;
   a third block mounted on the base and including an inclined surface that is inclined with respect to the surface of the base and a recess defined on a surface of the third block other than the inclined surface;
   a fourth block mounted on the base and including an inclined surface that is inclined with respect to the surface of the base and a recess defined on a surface of the fourth block other than the inclined surface;
   a first single-axis inertial force sensor arranged on the inclined surface of the first block;
   a second single-axis inertial force sensor arranged on the inclined surface of the second block;
   a third single-axis inertial force sensor arranged on the inclined surface of the third block;
   a fourth single-axis inertial force sensor arranged on the inclined surface of the fourth block;
   a connector including projections configured to fit the recesses of the first, second, third, and fourth blocks and configured to physically connect the first, second, third, and fourth blocks; and
   a circuit arithmetic processing and output module configured to execute an arithmetic algorithm that processes an output from each of the single-axis inertial force sensors and an output algorithm that outputs multiple-axis inertial force obtained by the arithmetic algorithm, wherein:
   the first and second blocks are aligned along a first direction parallel to the surface of the base with their inclined surfaces both facing inward toward a center of the surface of the base or both facing outward toward peripherals of the surface of the base, and
   the third and fourth blocks are aligned along a second direction parallel to the surface of the base and orthogonal to the first direction with their inclined surfaces both facing inward toward the center of the surface of the base or both facing outward toward peripherals of the surface of the base.

6. The inertial force sensor according to claim 5, wherein the connector is configured of a first connector, a second connector, a third connector, and a fourth connector,
   the first connector connects the first and third blocks,
   the second connector connects the second and fourth blocks,
   the third connector connects the third and second blocks, and
   the fourth connector connects the fourth and first blocks.

7. The inertial force sensor according to claim 5, wherein the first, second, third, and fourth blocks are identical in shape.

8. The inertial force sensor according to claim 5, wherein the first, second, third, and fourth blocks are constituted of a same resin material.

9. The inertial force sensor according to claim 5, wherein the connector is constituted of a resin material that is a same material that constitutes the blocks.

10. An inertial force sensor comprising:
a base;
a first block mounted on the base and including an inclined surface that is inclined with respect to a surface of the base, and a recess and a reference projection arranged on a surface of the first block other than the inclined surface;
a second block mounted on the base and including an inclined surface that is inclined with respect to the surface of the base and a recess defined on a surface of the second block other than the inclined surface;
a third block mounted on the base and including an inclined surface that is inclined with respect to the surface of the base and a recess defined on a surface of the third block other than the inclined surface;
a fourth block mounted on the base and including an inclined surface that is inclined with respect to the surface of the base and a recess defined on a surface of the fourth block other than the inclined surface;
a first single-axis inertial force sensor arranged on the inclined surface of the first block;
a second single-axis inertial force sensor arranged on the inclined surface of the second block;
a third single-axis inertial force sensor arranged on the inclined surface of the third block;
a fourth single-axis inertial force sensor arranged on the inclined surface of the fourth block;
a connector including projections configured to fit the recesses of two of the first, second, third, and fourth blocks and configured to physically connect the blocks; and
a circuit arithmetic processing and output module configured to execute an arithmetic algorithm that processes an output from each of the single-axis inertial force sensors and an output algorithm that outputs multiple-axis inertial force obtained by the arithmetic algorithm, wherein:
the first and second blocks are aligned along a first direction parallel to the surface of the base with their inclined surfaces both facing inward toward a center of the surface of the base, and
the third and fourth blocks are aligned along a second direction parallel to the surface of the base and orthogonal to the first direction with their inclined surfaces both facing inward toward the center of the surface of the base.

11. The inertial force sensor according to claim 10, wherein the reference projections are in contact with a surface of the connector.

12. The inertial force sensor according to claim 10, wherein the reference projection of each block is in contact with the reference projection of another block.

13. The inertial force sensor according to claim 10, wherein more than two reference projections are further arranged on the surface of each block.

14. The inertial force sensor according to claim 10, wherein the first, second, third, and fourth blocks are identical in shape.

15. The inertial force sensor according to claim 10, wherein the first, second, third, and fourth blocks are constituted of a same resin material.

16. The inertial force sensor according to claim 10, wherein the connector is constituted of a resin material that is a same material that constitutes the blocks.

17. An inertial force sensor comprising:
a base;
a first block mounted on the base and including an inclined surface that is inclined with respect to a surface of the base and a metal pad arranged on a surface of the first block other than the inclined surface;
a second block mounted on the base and including an inclined surface that is inclined with respect to the surface of the base and a recess defined on a surface of the second block other than the inclined surface;
a third block mounted on the base and including an inclined surface that is inclined with respect to the surface of the base and a recess defined on a surface of the third block other than the inclined surface;
a fourth block mounted on the base and including an inclined surface that is inclined with respect to the surface of the base and a recess defined on a surface of the fourth block other than the inclined surface;
a first single-axis inertial force sensor arranged on the inclined surface of the first block;
a second single-axis inertial force sensor arranged on the inclined surface of the second block;
a third single-axis inertial force sensor arranged on the inclined surface of the third block;
a fourth single-axis inertial force sensor arranged on the inclined surface of the fourth block;
a connector including metal connection pads welded to the metal pad of each block and configured to physically connect the first, second, third, and fourth blocks; and
a circuit arithmetic processing and output module configured to execute an arithmetic algorithm that processes an output from each of the single-axis inertial force sensors and an output algorithm that outputs multiple-axis inertial force obtained by the arithmetic algorithm, wherein:
the first and second blocks are aligned along a first direction parallel to the surface of the base with their inclined surfaces both facing inward toward a center of the surface of the base, and
the third and fourth blocks are aligned along a second direction parallel to the surface of the base and orthogonal to the first direction with their inclined surfaces both facing inward toward the center of the surface of the base.

18. The inertial force sensor according to claim 17, wherein the first, second, third, and fourth blocks are identical in shape.

19. The inertial force sensor according to claim 17, wherein the first, second, third, and fourth blocks are constituted of a same resin material.

20. The inertial force sensor according to claim 17, wherein the connector is constituted of a resin material that is a same material that constitutes the blocks.

* * * * *